(12) United States Patent
Patchava et al.

(10) Patent No.: US 12,695,480 B2
(45) Date of Patent: Jul. 28, 2026

(54) SHIFTED BACKSCATTERING-BASED CHANNEL ESTIMATION FOR WIRELESS POWER TRANSFER TO PASSIVE DEVICES

(71) Applicant: QUALCOMM Incorporated, San Diego, CA (US)

(72) Inventors: Raviteja Patchava, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 18/335,837

(22) Filed: Jun. 15, 2023

(65) Prior Publication Data

US 2024/0421856 A1     Dec. 19, 2024

(51) Int. Cl.
H04B 5/77     (2024.01)
H02J 50/00     (2016.01)
H02J 50/20     (2016.01)
H04B 5/79     (2024.01)

(52) U.S. Cl.
CPC .............. H04B 5/77 (2024.01); H02J 50/001 (2020.01); H02J 50/20 (2016.02); H04B 5/79 (2024.01)

(58) Field of Classification Search
CPC .......... H04B 5/45; H04B 7/0617; H04B 5/77; H04B 5/79; H04B 7/0626; H04B 7/22; H02J 50/001; H02J 50/20; H03L 7/081
See application file for complete search history.

(56) References Cited

U.S. PATENT DOCUMENTS

| | | | | |
|---|---|---|---|---|
| 9,482,742 B1 * | 11/2016 | Fischer | .................. | H04L 5/0023 |
| 2015/0091706 A1 * | 4/2015 | Chemishkian | ..... | G06K 7/10158 |
| | | | | 340/10.34 |
| 2017/0149127 A1 * | 5/2017 | Li | ............................ | H01Q 9/42 |
| 2018/0167121 A1 * | 6/2018 | Hakola | ................. | H04B 7/0413 |
| 2020/0106305 A1 * | 4/2020 | Calhoun | ............... | H02J 50/001 |
| 2020/0266673 A1 * | 8/2020 | Reynolds | ................ | H02J 50/20 |
| 2024/0053266 A1 * | 2/2024 | Srinivasan | ............. | G01N 21/47 |
| 2024/0171269 A1 * | 5/2024 | Xu | ........................ | H04B 17/336 |

FOREIGN PATENT DOCUMENTS

WO     2022200673 A1     9/2022

OTHER PUBLICATIONS

International Search Report and Written Opinion—PCT/US2024/025866—ISA/EPO —Jul. 23, 2024.

* cited by examiner

*Primary Examiner* — Angelica Perez
(74) *Attorney, Agent, or Firm* — Polsinelli

(57)     ABSTRACT

Disclosed are systems, apparatuses, processes, and computer-readable media for wireless communications. For example, a network device can transmit, to a group of passive devices, a continuous wave (CW) signal. The network device can receive, from each passive device of the group of passive devices, at least one backscatter signal, based on the CW signal, at a respective frequency shift. The network device can estimate, based on the at least one backscatter signal, channel information for each passive device of the group of passive devices. The network device can then determine, based on the channel information, a channel for transmitting an energy signal to at least one passive device of the group of passive devices for energy harvesting.

30 Claims, 16 Drawing Sheets

1100

1350

Receive, From A Network Device, A Continuous Wave
(CW) Signal
1352

Transmit, To The Network Device Based On The CW
Signal, A Backscatter Signal At A Frequency Shift For
Estimating Channel Information For The Passive Device
1354

SHIFTED BACKSCATTERING-BASED CHANNEL ESTIMATION FOR WIRELESS POWER TRANSFER TO PASSIVE DEVICES

FIELD

Aspects of the present disclosure generally relate to wireless communications. For example, aspects of the present disclosure relate to shifted backscattering-based channel estimation for wireless power transfer of passive devices (e.g., ambient-internet-of-things (IoT) devices).

INTRODUCTION

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for performing shifted backscattering-based channel estimation for wireless power transfer of passive devices (e.g., ambient-IoT devices). According to at least one illustrative example, a network device for wireless communication is provided. The network device includes at least one memory and at least one processor coupled to the at least one memory and configured to: output, for transmission to a group of passive devices, a continuous wave (CW) signal; receive, from each passive device of the group of passive devices, at least one backscatter signal, based on the CW signal, at a respective frequency shift; estimate, based on the at least one backscatter signal, channel information for each passive device of the group of passive devices; and determine, based on the channel information, a channel for transmitting an energy signal to at least one passive device of the group of passive devices for energy harvesting.

In another illustrative example, a method of wireless communication performed at a network device is provided.

The method includes: transmitting, by the network device to a group of passive devices, a continuous wave (CW) signal; receiving, by the network device from each passive device of the group of passive devices, at least one backscatter signal, based on the CW signal, at a respective frequency shift; estimating, by the network device based on the at least one backscatter signal, channel information for each passive device of the group of passive devices; and determining, by the network device based on the channel information, a channel for transmitting an energy signal to at least one passive device of the group of passive devices for energy harvesting.

In another illustrative example, a non-transitory computer-readable storage medium is provided including instructions stored thereon which, when executed by at least one processor, causes the at least one processor to: output, for transmission to a group of passive devices, a continuous wave (CW) signal; receive, from each passive device of the group of passive devices, at least one backscatter signal, based on the CW signal, at a respective frequency shift; estimate, based on the at least one backscatter signal, channel information for each passive device of the group of passive devices; and determine, based on the channel information, a channel for transmitting an energy signal to at least one passive device of the group of passive devices for energy harvesting.

In another illustrative example, an apparatus for wireless communication is provided. The apparatus includes: means for transmitting, to a group of passive devices, a continuous wave (CW) signal; means for receiving, from each passive device of the group of passive devices, at least one backscatter signal, based on the CW signal, at a respective frequency shift; means for estimating, based on the at least one backscatter signal, channel information for each passive device of the group of passive devices; and means for determining, device based on the channel information, a channel for transmitting an energy signal to at least one passive device of the group of passive devices for energy harvesting.

According to another illustrative example, a passive device for wireless communication is provided. The passive device includes at least one memory and at least one processor coupled to the at least one memory and configured to: receive, from a network device, a continuous wave (CW) signal; and output, for transmission to the network device based on the CW signal, a backscatter signal at a frequency shift for estimating channel information for the passive device.

In another illustrative example, a method of wireless communication performed at a passive device is provided. The method includes: receiving, by the passive device from a network device, a continuous wave (CW) signal; and transmitting, by the passive device to the network device based on the CW signal, a backscatter signal at a frequency shift for estimating channel information for the passive device.

In another illustrative example, a non-transitory computer-readable storage medium is provided including instructions stored thereon which, when executed by at least one processor, causes the at least one processor to: receive, from a network device, a continuous wave (CW) signal; and output, for transmission to the network device based on the CW signal, a backscatter signal at a frequency shift for estimating channel information for the passive device.

In another illustrative example, an apparatus for wireless communication is provided. The apparatus includes: means for receiving, from a network device, a continuous wave (CW) signal; and means for transmitting, to the network device based on the CW signal, a backscatter signal at a frequency shift for estimating channel information for the passive device.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
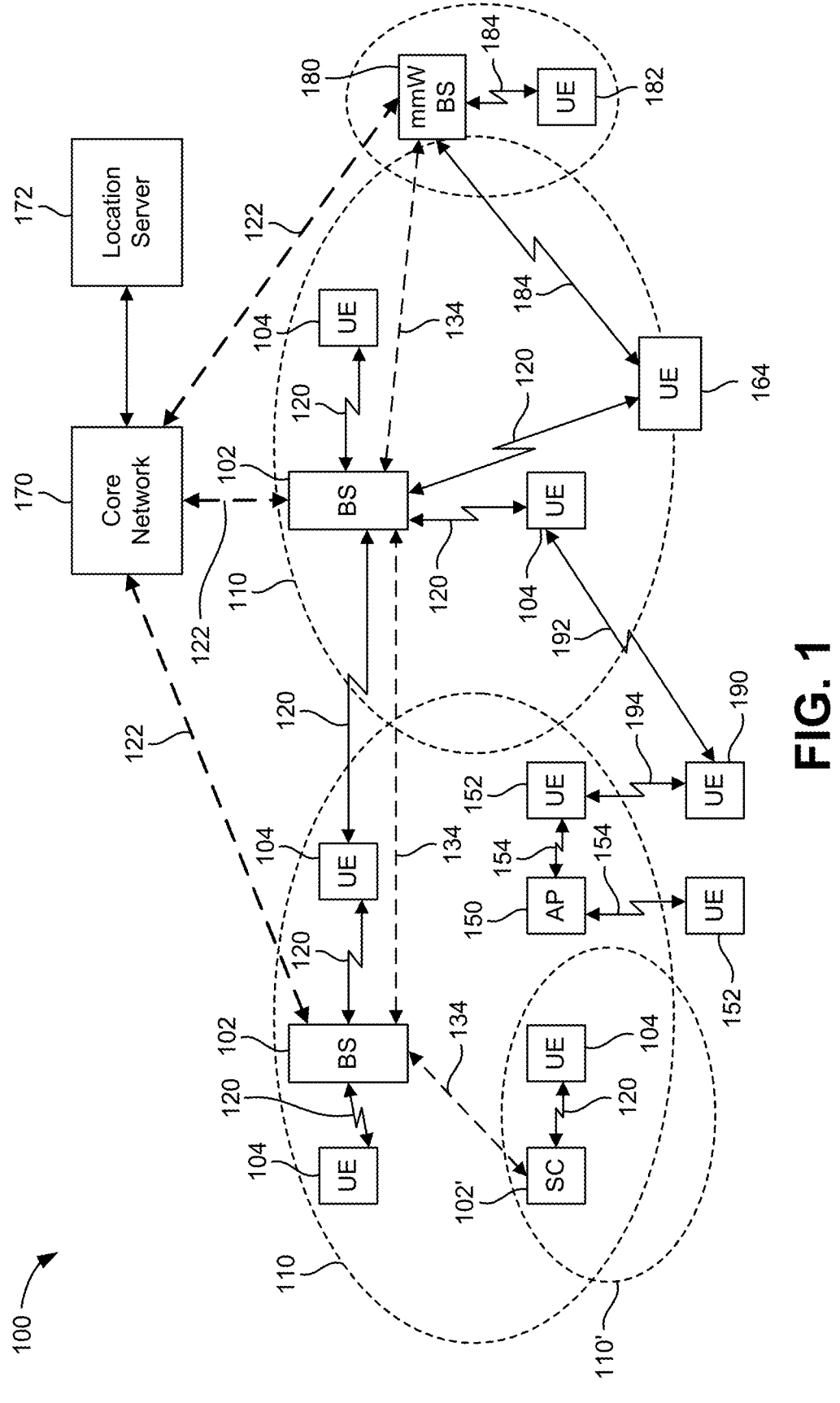
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, various client devices can be utilized that may be associated with different signaling and communication needs. For example, as 5G networks expand into industrial verticals and the quantity of deployed Internet-of-Things (IoT) devices grows, network service categories such as enhanced Mobile Broadband (eMBB), Ultra Reliable Low Latency Communications (URLLC), and massive Machine Type Communications (mMTC), etc., may be expanded to better support various IoT devices, which can include passive IoT devices, semi-passive IoT devices, etc.

For example, passive IoT devices and semi-passive IoT devices are relatively low-cost UEs that may be used to implement one or more sensing and communication capabilities in an IoT network or deployment. In some examples, passive and/or semi-passive IoT sensors (e.g., devices) can be used to provide sensing capabilities for various processes and use cases, such as asset management, logistics, warehousing, manufacturing, etc. Passive and semi-passive IoT devices can include one or more sensors, a processor or micro-controller, and an energy harvester for generating electrical power from incident downlink radio frequency (RF) signals received at the passive or semi-passive IoT device.

Based on harvesting energy from incident downlink RF signals (e.g., transmitted by a network device such as a base station, gNB, etc.), energy harvesting devices (e.g., such as passive IoT devices, semi-passive IoT devices, etc.) can be provided without an energy storage element and/or can be provided with a relatively small energy storage element (e.g., battery, capacitor, etc.) Energy harvesting devices can be deployed at large scales, based on the simplification in their manufacture and deployment associated with implementing wireless energy harvesting.

In a wireless communication network environment (e.g., cellular network, etc.), a network device (e.g., such as a base station or gNB, etc.) can be used to transmit downlink RF signals to energy harvesting devices. In one illustrative example, a base station or gNB can read and/or write information stored on energy harvesting IoT devices by transmitting the downlink RF signal. A downlink RF signal can provide energy to an energy harvesting IoT device and can be used as the basis for an information-bearing uplink signal transmitted back to the network device by the energy harvesting IoT device (e.g., based on reflecting or backscattering a portion of the incident downlink RF signal). The base station or gNB can read the reflected signal transmitted by an energy harvesting IoT device to decode the information transmitted by the IoT device (e.g., such as sensor information collected by one or more sensors included in the IoT device, etc.).

In some examples, for a given downlink signal with a given input RF power received at an energy harvesting device, a first portion of the input RF power is provided to the device's energy harvester (e.g., with a percentage being converted to useful electrical power based on the conversion efficiency of the harvester, and the remaining percentage wasted or dissipated as heat, etc.). A remaining, second portion of the input RF power is available for use in the backscattered uplink transmission (e.g., the second portion of the input power is reflected and modulated with the uplink communication).

As 5G expands to more and more industrial verticals (e.g., besides enhanced mobile broadband (eMBB), ultra reliable and low latency communication (URLLC), and machine type communications (MTC)), 5G and beyond may be expanded to support passive IoT devices. 3rd Generation Partnership Project (3GPP) has developed specifications to support MTC/narrowband (NB)-IoT and reduced capability (RedCap) for MTC use cases. However, 5G cannot efficiently support the pervasive radio frequency identification (RFID)-type of sensors (e.g., passive IoT devices) in many future use cases, such as for asset management, logistics, warehousing, and manufacturing. In the future, 3GPP Release 18 and beyond (e.g., 6G) may be required to manage passive IoT devices. For example, a base station, such as a gNodeB (gNB), may need to read and/or write information stored on passive IoT devices, provide energy to passive IoT devices, receive a reflected information-bearing signal from a passive IoT device, and/or read a reflected signal received from a passive IoT device to decode information transmitted by that passive IoT device.

RF power harvesting (PH) for passive IoT devices generally is non-linear with a required input power at the PH circuitry of an IoT device (e.g., due to diodes within the PH circuitry). Typically, an input power larger than −20 decibel-milliwatts (dBm) is needed (e.g., in some cases, an input power larger than −10 dBm may be needed) to "turn-on" the PH circuitry of an IoT device (e.g., to turn-on the voltage of the diodes within the PH circuitry). Power harvesting by passive IoT devices is more efficient at lower frequencies, due to the diode junction capacitance and resistance of the PH circuitry (e.g., a frequency-selective conversion efficiency).

RFID devices (e.g., passive IoT devices in the form of RFID tags) support only short-range communications (e.g., less than 10 meters, due to insufficient link budget issues). The power link for an RFID tag (e.g., the downlink, which is the reader to the RFID tag link) is critical for powering the RFID tag. The PH circuitry of an RFID tag typically requires a high input power (e.g., an input power larger than −13 dBm). An input power of −20 dBm or below cannot ensure satisfactory cost and conversion efficiency (e.g. below one percent) for an RFID tag. In some cases, reflections by multipath can cause fading in the energy signal and, as such, can degrade the range of the RFID tag.

Coverage of a wireless power transfer (e.g., from a reader to an RFID tag) can be improved by beamforming the signal (e.g., the power link) either in the frequency domain or the space domain, where both methods require knowledge of the channel, such as channel state information (CSI). In 5G NR, CSI can be obtained by either transmitting a CSI-reference signal (CSI-RS) and receiving feedback (e.g., a reflection signal) from user equipment (UE), or by using a received sounding reference signal (SRS) transmitted by a UE. However, for a semi-passive IoT tag (e.g., an RFID tag), it can be very energy intensive (and costly) to obtain (e.g., measure) the CSI through using a CSI-RS or an SRS. As such, an improved technique for estimating the CSI for an RFID tag(s) can be beneficial for power harvesting for an RFID tag(s).

Systems, apparatuses, processes (also referred to as methods), and computer-readable media (collectively referred to as "systems and techniques") are described herein for providing shifted backscattering-based channel estimation for wireless power transfer of passive devices (e.g., ambient-IoT devices, such as RFID tags). For example, the systems and techniques can estimate the CSI for one or more passive devices (e.g., one or more RFID tags) by using backscattering and provide signaling required to multiplex RFID tags for the CSI estimation. In some cases, based on the CSI estimation, the reader can determine a channel for transmission of energy signals for providing energy for harvesting by the one or more passive devices.

In one or more aspects, during operation for channel estimation (e.g., CSI estimation), a plurality of passive devices (e.g., RFID tags) can each send (e.g., transmit) respective passive device information (e.g., tag information) associated with each passive device to a reader (e.g., a gNB). The passive device information can include a parts per million (PPM) requirement for the tag (e.g., which is related to the stability of the local oscillator of the tag) and a frequency shifting capability for the tag. Upon receiving the tag information from the tags, the reader can use the tag information to determine a group of tags, from the plurality of the tags, for estimating the CSI. Based on the tag information, the reader can also determine a respective frequency shift for each of the tags in the group of tags.

Once the reader has determined the group of tags and the different frequency shifts for the tags in the group of tags, the reader can send (e.g., transmit) a select signal to the group of tags. The select signal can include select information, which can include, but is not limited to, a group identification (ID) for the group of tags, the different frequency shifts for each of the tags (e.g., which can include an associated tag ID for each of the frequency shifts), and channel information including the frequency and time of transmission for each of the channel(s) that the reader will use to transmit a continuous wave (CW) signal for the CSI estimation, and, optionally, a backscattering threshold value (e.g., a gain threshold value) for the backscattering by the tags. The backscattering threshold value can indicate a maximum level (e.g., a maximum gain value) for a tag to transmit a backscatter signal.

The reader can send (e.g., transmit) a CW signal to the group of tags using the channel(s), as specified in the channel information. Each of the tags in the group of tags can backscatter the CW signal. In some cases, as noted above, the reader can transmit a select signal to the tags in the group, which can include a backscattering threshold value. In one illustrative example, the backscattering threshold value can be a gain threshold value. For instance, a tag in the group of tags may not backscatter the CW signal when the gain of the received CW signal at that tag is higher than (or equal to) the gain threshold value (e.g., a maximum gain value), and may backscatter the CW signal when the gain of the received CW signal at that tag is less than (or equal to) the gain threshold value.

The reader can receive the backscatter signals from the tags in the group of tags. Based on the received backscatter signals, the reader can estimate the CSI. Based on the estimated CSI, the reader can determine which channel to use to transmit one or more energy signals to particular tags for power harvesting by those tags. In some cases, the reader can use the estimated CSI to determine which tags in the group of tags that need to harvest energy.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
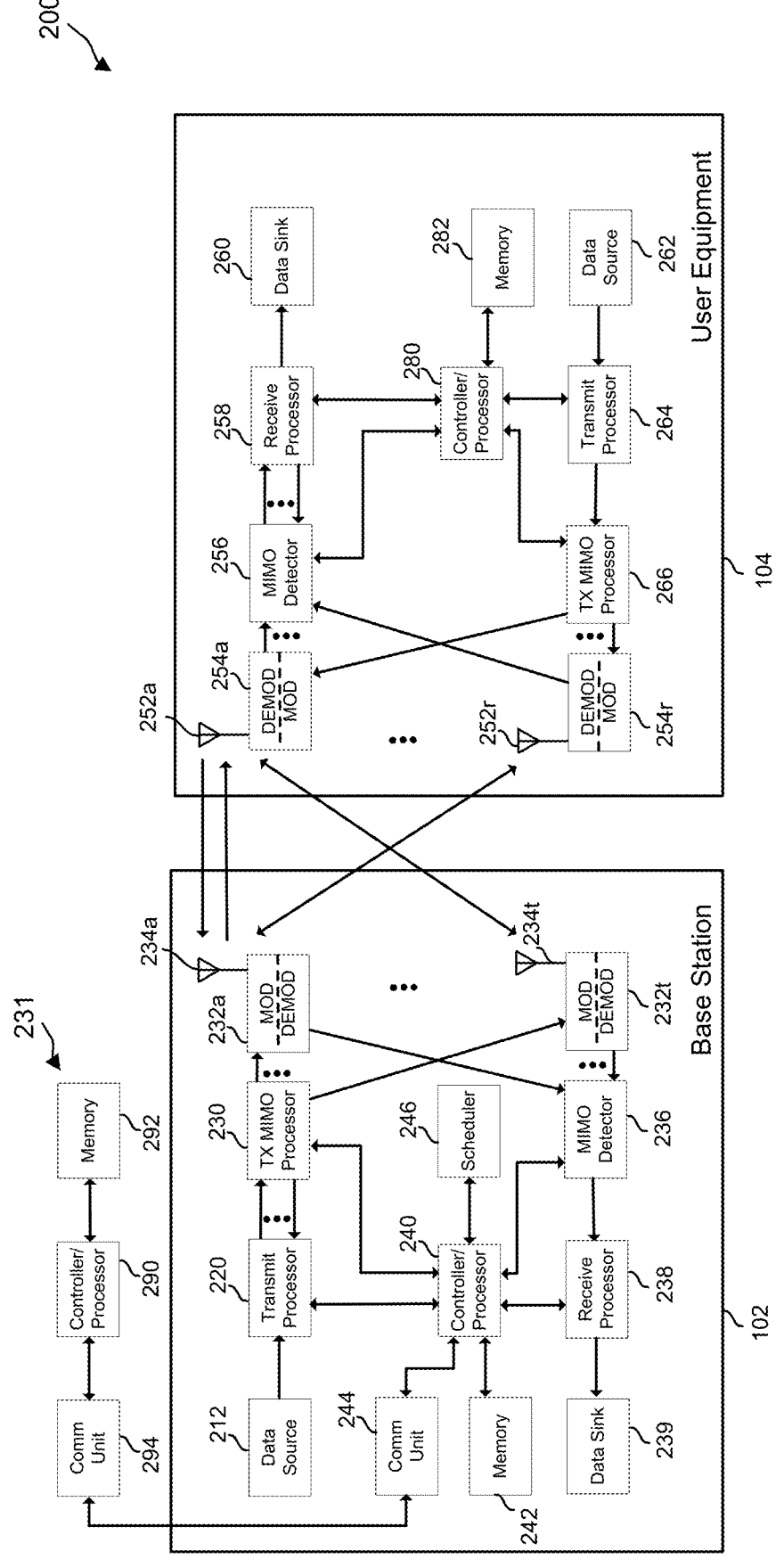
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream (e.g., for an orthogonal frequency-division multiplexing (OFDM) scheme and/or the like) to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to one or more demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
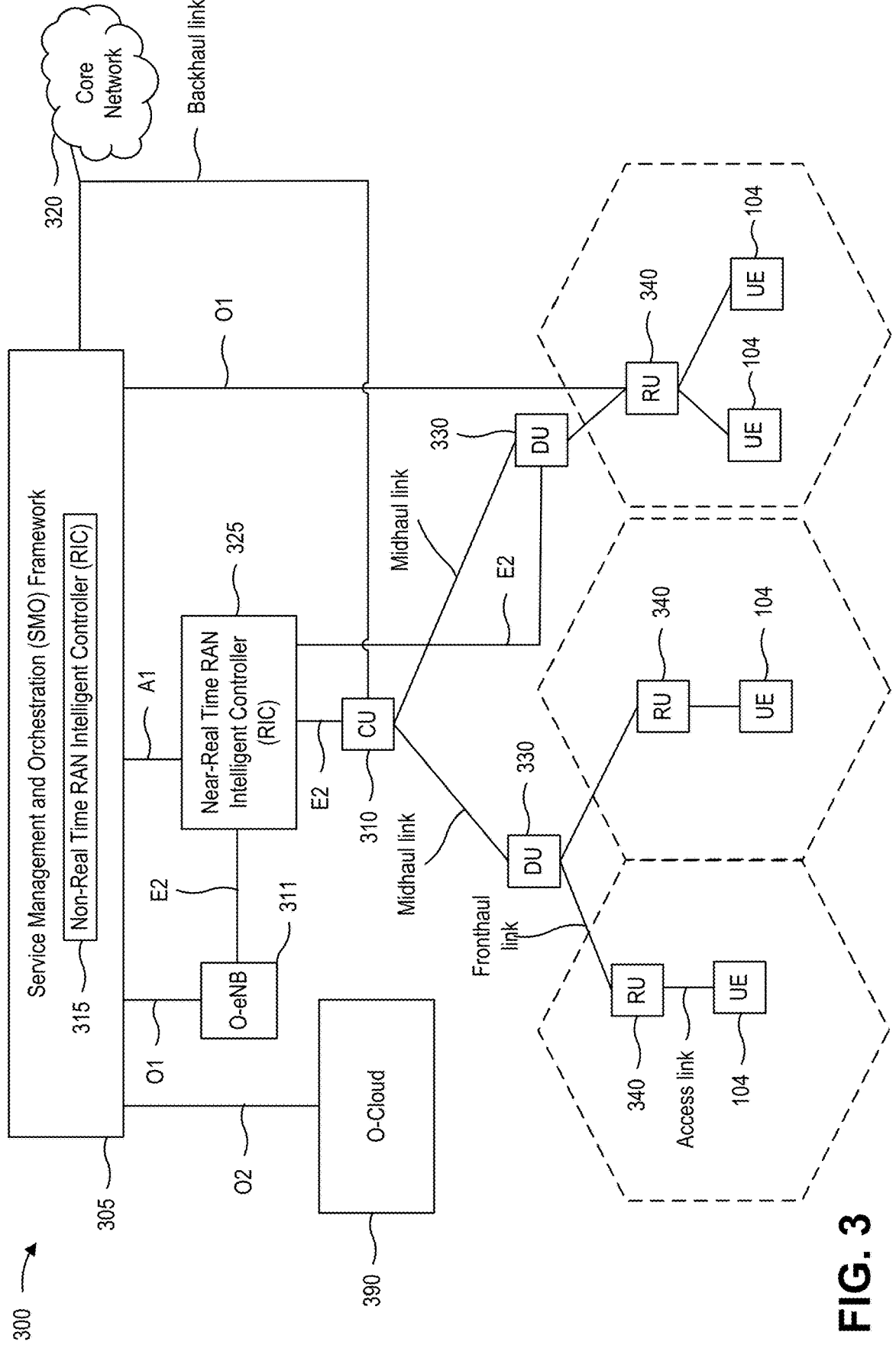
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUs 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via 01) or via creation of RAN management policies (e.g., such as A1 policies).

Figure 4:
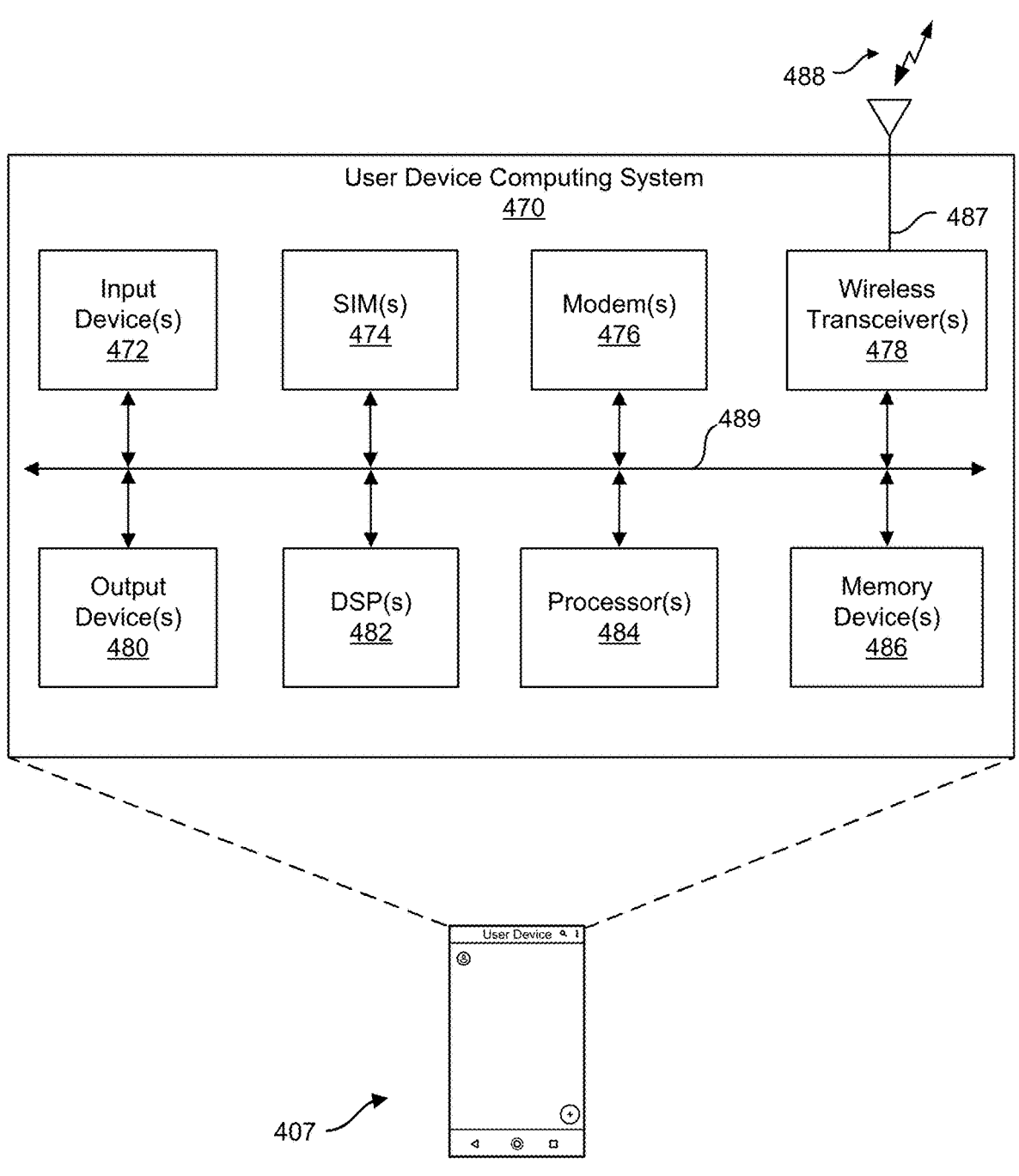
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5:
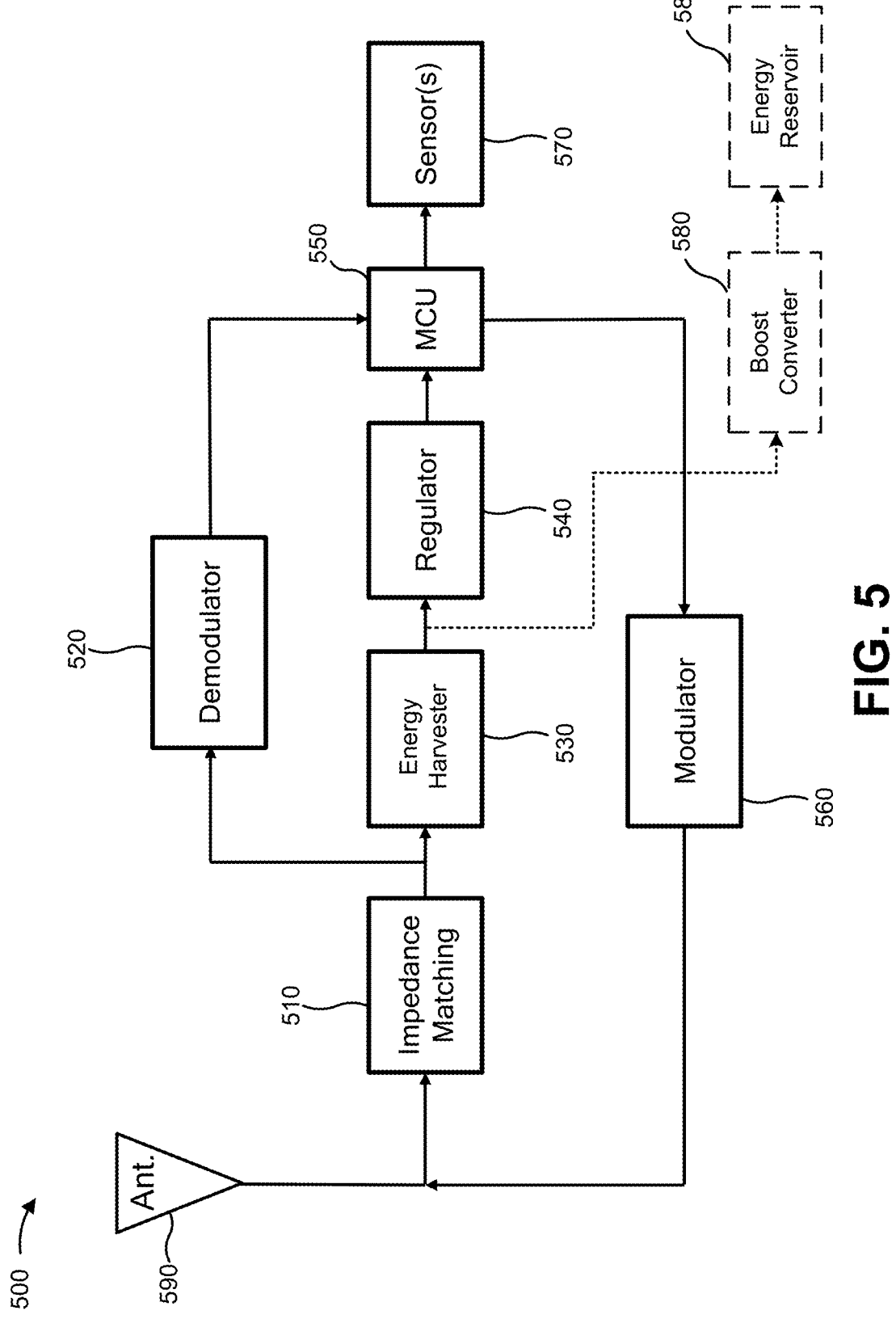
FIG. 5 is a diagram illustrating an example of a radio frequency (RF) energy harvesting device, in accordance with some examples.

FIG. 5 is a diagram illustrating an example of an architecture of a radio frequency (RF) energy harvesting device 500, in accordance with some examples. As will be described in greater depth below, the RF energy harvesting device 500 can harvest RF energy from one or more RF signals received using an antenna 590. As used herein, the term "energy harvesting" may be used interchangeably with "power harvesting." In some aspects, an "energy harvesting device" can be a device that is capable of performing energy harvesting (EH). For example, as used herein, the term "energy harvesting device" may be used interchangeably with the term "EH-capable device" or "energy harvesting-capable device." In some aspects, energy harvesting device 500 can be implemented as an Internet-of-Things (IoT) device, can be implemented as a sensor, etc., as will be described in greater depth below. In other examples, energy harvesting device 500 can be implemented as a Radio-Frequency Identification (RFID) tag or various other RFID devices.

The energy harvesting device 500 includes one or more antennas 590 that can be used to transmit and receive one or more wireless signals. For example, energy harvesting device 500 can use antenna 590 to receive one or more downlink signals and to transmit one or more uplink signals. An impedance matching component 510 can be used to match the impedance of antenna 590 to the impedance of one or more (or all) of the receive components included in energy harvesting device 500. In some examples, the receive components of energy harvesting device 500 can include a demodulator 520 (e.g., for demodulating a received downlink signal), an energy harvester 530 (e.g., for harvesting RF energy from the received downlink signal), a regulator 540, a micro-controller unit (MCU) 550, a modulator 560 (e.g., for generating an uplink signal). In some cases, the receive components of energy harvesting device 500 may further include one or more sensors 570.

The downlink signals can be received from one or more transmitters. For example, energy harvesting device 500 may receive a downlink signal from a network node or network entity that is included in a same wireless network as the energy harvesting device 500. In some cases, the network entity can be a base station, gNB, etc., that communicates with the energy harvesting device 500 using a cellular communication network. For example, the cellular communication network can be implemented according to the 3G, 4G, 5G, and/or other cellular standard (e.g., including future standards such as 6G and beyond).

In some cases, energy harvesting device 500 can be implemented as a passive or semi-passive energy harvesting device (also referred to as a passive or semi-passive device), which perform passive uplink communication by modulating and reflecting a downlink signal received via antenna 590. A passive or semi-passive energy harvesting device may also be referred to as a passive or semi-passive EH-capable device, respectively. For example, passive and semi-passive energy harvesting devices may be unable to generate and transmit an uplink signal without first receiving a downlink signal that can be modulated and reflected. In other examples, energy harvesting device 500 may be implemented as an active energy harvesting device, which utilizes a powered transceiver to perform active uplink communication. An active energy harvesting device is able to generate and transmit an uplink signal without first receiving a downlink signal (e.g., by using an on-device power source to energize its powered transceiver).

An active or semi-passive energy harvesting device (e.g., also referred to as an active EH-capable device or a semi-passive EH-capable device, respectively) may include one or more energy storage elements 585 (e.g., collectively referred to as an "energy reservoir"). For example, the one or more energy storage elements 585 can include batteries, capacitors, etc. In some examples, the one or more energy storage elements 585 may be associated with a boost converter 580. The boost converter 580 can receive as input at least a portion of the energy harvested by energy harvester 530 (e.g., with a remaining portion of the harvested energy being provided as instantaneous power for operating the energy harvesting device 500). In some aspects, the boost converter 580 may be a step-up converter that steps up voltage from its input to its output (e.g., and steps down current from its input to its output). In some examples, boost converter 580 can be used to step up the harvested energy generated by energy harvester 530 to a voltage level associated with charging the one or more energy storage elements 585. An active or semi-passive energy harvesting device may include one or more energy storage elements 585 and may include one or more boost converters 580. A quantity of energy storage elements 585 may be the same as or different than a quantity of boost converters 580 included in an active or semi-passive energy harvesting device.

A passive energy harvesting device (e.g., also referred to as a "passive EH-capable device" or "passive device") does not include an energy storage element 585 or other on-device power source. For example, a passive energy harvesting device may be powered using only RF energy harvested from a downlink signal (e.g., using energy harvester 530). As mentioned previously, a semi-passive energy harvesting device can include one or more energy storage elements 585 and/or other on-device power sources. The energy storage element 585 of a semi-passive energy harvesting device can be used to augment or supplement the RF energy harvested from a downlink signal. In some cases, the energy storage element 585 of a semi-passive energy harvesting device may store insufficient energy to transmit an uplink communication without first receiving a downlink communication (e.g., minimum transmit power of the semi-passive device>capacity of the energy storage element). An active energy harvesting device can include one or more energy storage elements 585 and/or other on-device power sources that can power uplink communication without using supplemental harvested RF energy (e.g., minimum transmit power of the active device<capacity of the energy storage element). The energy storage element(s) 585 included in an active energy harvesting device and/or a semi-passive energy harvesting device can be charged using harvested RF energy.

As mentioned above, passive and semi-passive energy harvesting devices transmit uplink communications by performing backscatter modulation to modulate and reflect a received downlink signal. The received downlink signal is used to provide both electrical power (e.g., to perform demodulation, local processing, and modulation) and a carrier wave for uplink communication (e.g., the reflection of the downlink signal). For example, a portion of the downlink signal will be backscattered as an uplink signal and a remaining portion of the downlinks signal can be used to perform energy harvesting.

Active energy harvesting devices can transmit uplink communications without performing backscatter modulation and without receiving a corresponding downlink signal (e.g., an active energy harvesting device includes an energy storage element to provide electrical power and includes a powered transceiver to generate a carrier wave for an uplink communication). In the absence of a downlink signal, passive and semi-passive energy harvesting devices cannot transmit an uplink signal (e.g., passive communication). Active energy harvesting devices do not depend on receiving a downlink signal in order to transmit an uplink signal and can transmit an uplink signal as desired (e.g., active communication).

In examples in which the energy harvesting device 500 is implemented as a passive or semi-passive energy harvesting device, a continuous carrier wave downlink signal may be received using antenna 590 and modulated (e.g., re-modulated) for uplink communication. In some cases, a modulator 560 can be used to modulate the reflected (e.g., backscattered) portion of the downlink signal. For example, the continuous carrier wave may be a continuous sinusoidal wave (e.g., sine or cosine waveform) and modulator 560 can perform modulation based on varying one or more of the amplitude and the phase of the backscattered reflection. Based on modulating the backscattered reflection, modulator 560 can encode digital symbols (e.g., such as binary symbols or more complex systems of symbols) indicative of an uplink communication or data message. For example, the uplink communication may be indicative of sensor data or other information associated with the one or more sensors 570 included in energy harvesting device 500.

As mentioned previously, impedance matching component 510 can be used to match the impedance of antenna 590 to the receive components of energy harvesting device 500 when receiving the downlink signal (e.g., when receiving the continuous carrier wave). In some examples, during backscatter operation (e.g., when transmitting an uplink signal), modulation can be performed based on intentionally mismatching the antenna input impedance to cause a portion of the incident downlink signal to be scattered back. The phase and amplitude of the backscattered reflection may be determined based on the impedance loading on the antenna 590. Based on varying the antenna impedance (e.g., varying the impedance mismatch between antenna 590 and the remaining components of energy harvesting device 500), digital symbols and/or binary information can be encoded (e.g., modulated) onto the backscattered reflection. Varying the antenna impedance to modulate the phase and/or amplitude of the backscattered reflection can be performed using modulator 560.

As illustrated in FIG. 5, a portion of a downlink signal received using antenna 590 can be provided to a demodulator 520, which performs demodulation and provides a downlink communication (e.g., carried or modulated on the downlink signal) to a micro-controller unit (MCU) 550 or other processor included in the energy harvesting device 500. A remaining portion of the downlink signal received using antenna 590 can be provided to energy harvester 530, which harvests RF energy from the downlink signal. For example, energy harvester 530 can harvest RF energy based on performing AC-to-DC (alternating current-to-direct current) conversion, wherein an AC current is generated from the sinusoidal carrier wave of the downlink signal and the converted DC current is used to power the energy harvesting device 500. In some aspects, energy harvester 530 can include one or more rectifiers for performing AC-to-DC conversion. A rectifier can include one or more diodes or thin-film transistors (TFTs). In one illustrative example, energy harvester 530 can include one or more Schottky diode-based rectifiers. In some cases, energy harvester 530 can include one or more TFT-based rectifiers.

The output of the energy harvester 530 is a DC current generated from (e.g., harvested from) the portion of the downlink signal provided to the energy harvester 530. In some aspects, the DC current output of energy harvester 530 may vary with the input provided to the energy harvester 530. For example, an increase in the input current to energy harvester 530 can be associated with an increase in the output DC current generated by energy harvester 530. In some cases, MCU 550 may be associated with a narrow band of acceptable DC current values. Regulator 540 can be used to remove or otherwise decrease variation(s) in the DC current generated as output by energy harvester 530. For example, regulator 540 can remove or smooth spikes (e.g., increases) in the DC current output by energy harvester 530 (e.g., such that the DC current provided as input to MCU 550 by regulator 540 remains below a first threshold). In some cases, regulator 540 can remove or otherwise compensate for drops or decreases in the DC current output by energy harvester 530 (e.g., such that the DC current provided as input to MCU 550 by regulator 540 remains above a second threshold).

In some aspects, the harvested DC current (e.g., generated by energy harvester 530 and regulated upward or downward as needed by regulator 530) can be used to power MCU 550 and one or more additional components included in the energy harvesting device 500. For example, the harvested DC current can additionally be used to power one or more (or all) of the impedance matching 510, demodulator 520, regulator 540, MCU 550, sensors 570, modulator 560, etc. For example, sensors 570 and modulator 560 can receive at least a portion of the harvested DC current that remains after MCU 550 (e.g., that is not consumed by MCU 550). In some cases, the harvested DC current output by regulator 540 can be provided to MCU 550, modulator 560, and sensors 570 in series, in parallel, or a combination thereof.

In some examples, sensors 570 can be used to obtain sensor data (e.g., such as sensor data associated with an environment in which the energy harvesting device 500 is located). Sensors 570 can include one or more sensors, which may be of a same or different type(s). In some aspects, one or more (or all) of the sensors 570 can be configured to obtain sensor data based on control information included in a downlink signal received using antenna 590. For example, one or more of the sensors 570 can be configured based on a downlink communication obtained based on demodulating a received downlink signal using demodulator 520. In one illustrative example, sensor data can be transmitted based on using modulator 560 to modulate (e.g., vary one or more of amplitude and/or phase of) a backscatter reflection of the continuous carrier wave received at antenna 590. Based on modulating the backscattered reflection, modulator 560 can encode digital symbols (e.g., such as binary symbols or more complex systems of symbols) indicative of an uplink communication or data message. In some examples, modulator 560 can generate an uplink, backscatter modulated signal based on receiving sensor data directly from sensors 570. In some examples, modulator 560 can generate an uplink, backscatter modulated signal based on received sensor data from MCU 550 (e.g., based on MCU 550 receiving sensor data directly from sensors 570).

Figure 6:
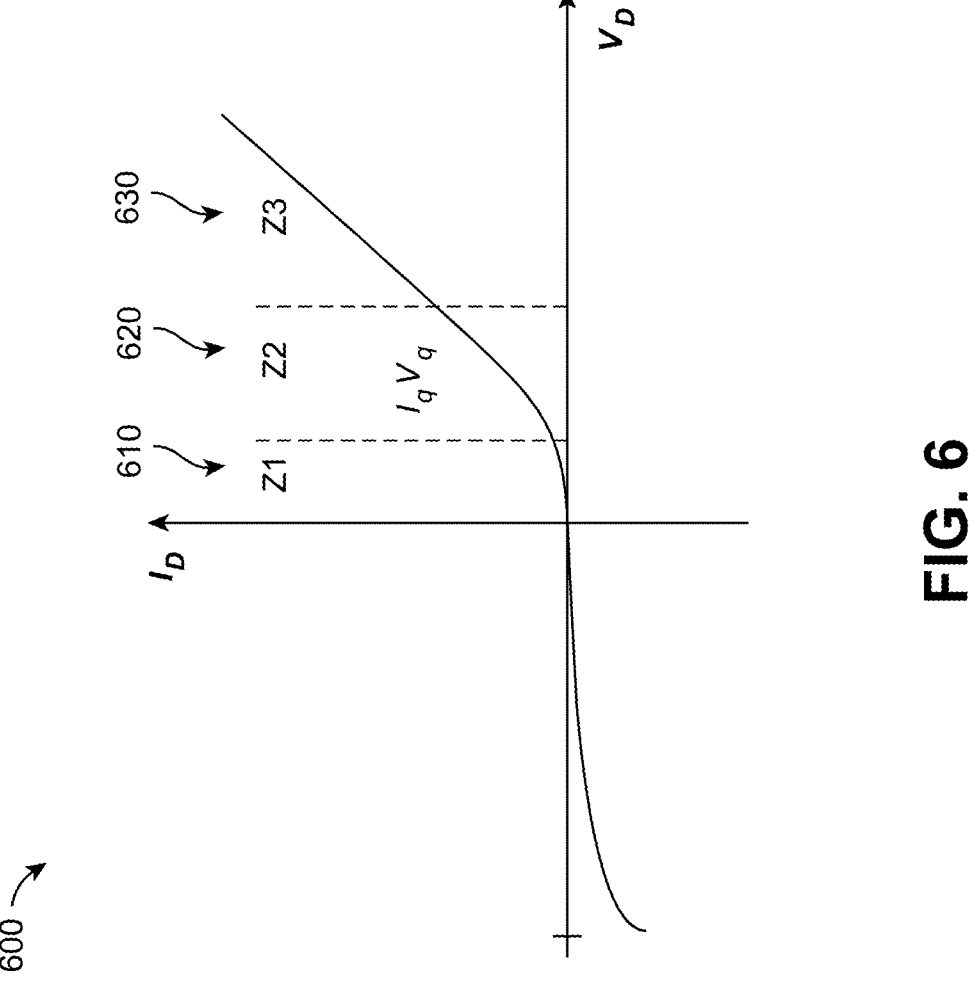
FIG. 6 is a diagram illustrating an example of small signal operation of a Schottky diode barrier, in accordance with some examples.

FIG. 6 is a diagram 600 illustrating an example of a small signal rectification operation that may be associated with performing energy harvesting, in accordance with some examples. In one illustrative example, the small signal rectification operation may be a small signal rectification operation associated with a Schottky diode barrier (e.g., a Schottky diode used to perform rectification associated with energy harvester 530 illustrated in FIG. 5).

In some cases, the rectification process in a diode barrier (e.g., Schottky diode or other diode) associated with performing energy harvesting can be classified into small signal operation and large signal operation. For example, large signal operation is associated with rectifying an input signal (e.g., a received downlink signal at an energy harvesting device that includes the diode) having a relatively large amplitude signal that causes the diode to operate in its resistive zone. Small signal operation (e.g., such as the example small signal operation illustrated in FIG. 6) can be associated with rectifying an input signal (e.g., or portion thereof) having a relatively small amplitude signal, such that the diode does not operate in its resistive zone.

For example, small signal operation of a rectifying process in a Schottky diode barrier may be associated with three different operating zones, as depicted in FIG. 6. In a first operating zone 610, the diode behavior may be approximated as quadratic. For example, in the first operating zone 610, the output signal of the diode may be proportional to the square of the input signal to the diode. In some cases, the first operating zone 610 may also be referred to as a square law zone. In a second operating zone 620, the diode behavior may become more affected by other contributions, and the relationship between the output-input signal of the diode may decrease from quadratic towards linear. In some cases, the second operating zone 620 may also be referred to as a transition zone. In a third operating zone 630, the output signal of the diode may be proportional to the input signal to the diode (e.g., a linear relationship between input and output signals of the diode) and no DC component is generated. The third operating zone 630 may also be referred to as a resistive zone.

Figure 7A:
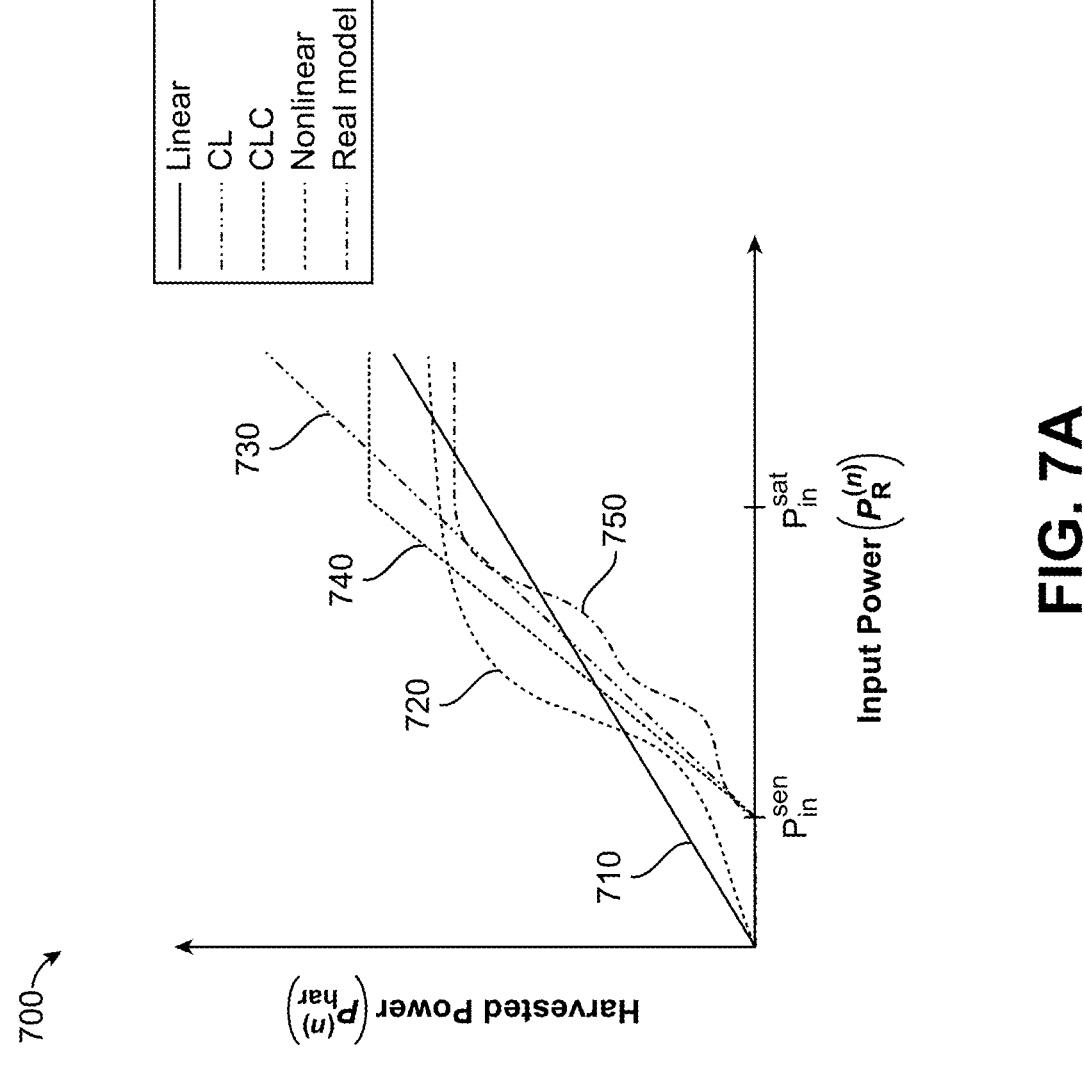
FIG. 7A is a diagram illustrating example energy harvesting characteristics between input power and harvested power, in accordance with some examples.

FIG. 7A is a diagram 700 illustrating examples of input power-harvested power conversion models that may be associated with various energy harvesting devices (e.g., such as the energy harvesting device 500 illustrated in the example of FIG. 5, above). Diagram 700 includes a first power conversion model 710, a second power conversion model 720, a third power conversion model 730, a fourth power conversion model 740, and a fifth power conversion model 750. In some aspects, different energy harvesting devices may be associated with different models between input power (e.g., the total RF energy or power of the portion of the received downlink signal provided to energy harvester 530 illustrated in FIG. 5) and harvested power (e.g., the RF energy or power that is harvested and output by energy harvester 530). In some aspects, the power conversion models 710-750 may be associated with passive, semi-passive, and/or active energy harvesting devices.

The first power conversion model 710 can be associated with a first type or category of energy harvesting devices. For example, energy harvesting devices having the first power conversion model 710 can provide harvested power as a continuous, linear, increasing function of the input RF power.

The second power conversion model 720 can be associated with a second type or category of energy harvesting devices. For example, energy harvesting devices having the second power conversion model 720 can provide harvested power as a continuous, non-linear, increasing function of the input RF power.

The third power conversion model 730 can be associated with a third type or category of energy harvesting device. For example, energy harvesting devices having the third power conversion model 730 can provide harvested power that is a continuous, linear, increasing function of the input RF power, given that the input RF power is above a sensitivity threshold $$(P_{in}^{sen}).$$

The sensitivity threshold $$P_{in}^{sen}$$

can represent a minimum input RF power for which the energy harvesting device is able to perform harvesting (e.g., is able to harvest a non-zero amount of power). When the input RF power is below the sensitivity threshold $$(P_{in}^{sen}),$$

the harvested power is zero.

The fourth power conversion model 740 can be associated with a fourth type or category of energy harvesting device. For example, energy harvesting devices having the fourth power conversion model 740 can provide harvested power that is a continuous, linear, increasing function of the input RF power, given that the input RF power is both above the sensitivity threshold $$P_{in}^{sen}$$

and is below a saturation threshold $$P_{in}^{sat}.$$

As illustrated, the saturation threshold $$P_{in}^{sat}$$

is greater than the sensitivity threshold $$P_{in}^{sen}.$$

When the input RF power is below the sensitivity threshold $$P_{in}^{sat},$$

the harvested power is zero. When the input RF power is above the saturation threshold $$P_{in}^{sat},$$

the harvested power output saturates (e.g., remains approximately constant for any input RF power above the saturation threshold).

The fifth power conversion model 750 can be associated with a fifth type or category of energy harvesting device. For example, for an input RF power between the sensitivity threshold $$P_{in}^{sen}$$

and the saturation threshold $$P_{in}^{sat},$$

energy harvesting devices having the fifth power conversion model 750 can provide harvested power that is a continuous, non-linear, increasing function of the input RF power.

Figure 7B:
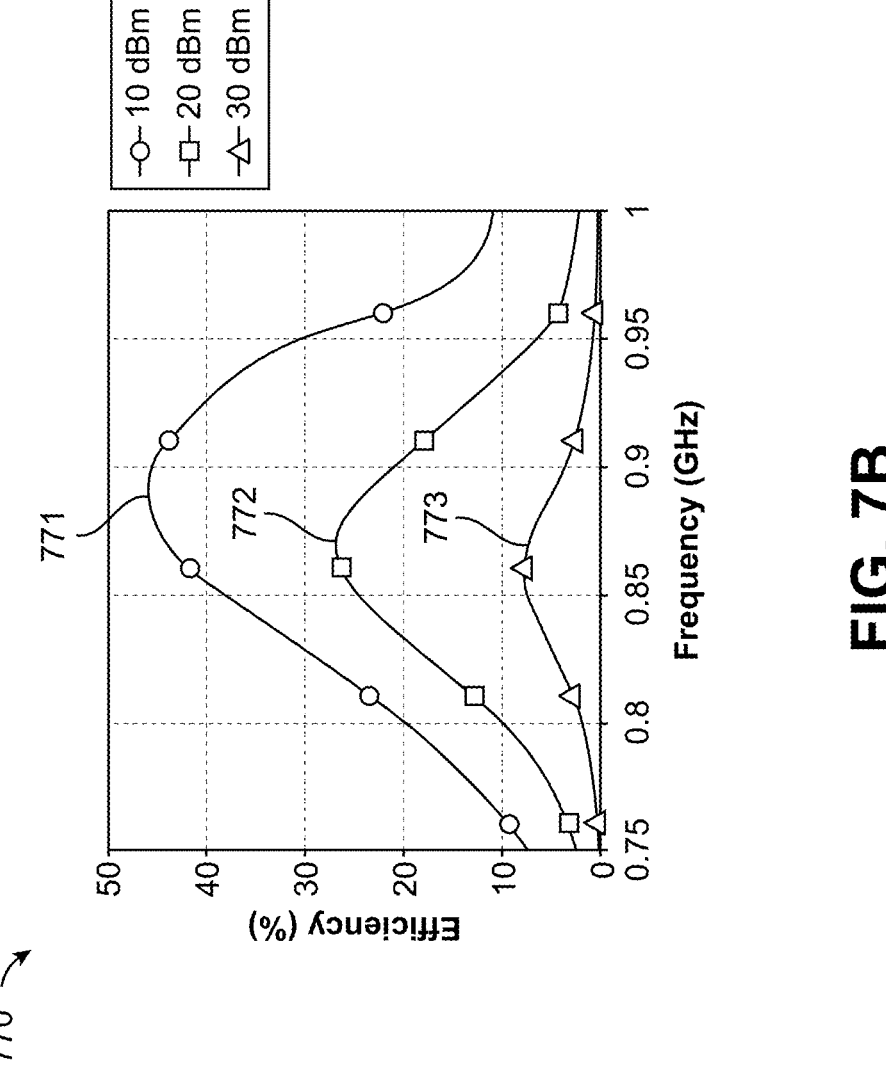
FIG. 7B is a diagram illustrating an example of energy conversion efficiency associated with different frequencies and input powers, in accordance with some examples.

In some examples, an efficiency of an energy harvesting device can be determined as a percentage of the input RF power that is converted into harvested power. FIG. 7B is a diagram 770 illustrating an example of energy conversion efficiency vs. frequency (e.g., of an input waveform to the energy harvesting device) for different input powers. For example, a first efficiency-frequency relationship 771 is shown for an input RF power of −10 dBm (decibel milli-watts), a second efficiency-frequency relationship 772 is shown for an input RF power of −20 dBm, and a third efficiency-frequency relationship 773 is shown for an input RF power of −30 dBm.

The three efficiency-frequency relationships 771, 772, 773 depicted in FIG. 7B may each be associated with an optimum operating frequency, or an optimum operating frequency band, for which the energy conversion efficiency of a corresponding energy harvesting device is maximized. For example, for an input RF power of −30 dBm, an energy harvesting device with the third energy conversion model 773 may maximize its energy conversion efficiency with an input RF waveform centered at a frequency of 0.86 GHz. In another example, for an input RF power of −20 dBm, an energy harvesting device with the second energy conversion model 772 may maximize its energy conversion efficiency with an input RF waveform centered at a frequency of 0.87 GHz. In another example, for an input RF power of −10 dBm, an energy harvesting device with the first energy conversion model 771 may maximize its energy conversion efficiency with an input RF waveform centered at a frequency of 0.89 GHz.

In some aspects, the efficiency of an energy harvesting device may vary based on the input RF power (e.g., the RF power of the downlink signal received at an antenna of the energy harvesting device) and the center frequency of the input RF waveform. For example, as illustrated in FIG. 7B, the maximum or peak efficiency of an energy harvesting device that receives a relatively low input RF power may be less than the maximum or peak efficiency of an energy harvesting device that receives a relatively high input RF power (e.g., at −30 dBm the peak efficiency of energy conversion model 773 is below 10%, at −20 dBm the peak efficiency of energy conversion model 772 is approximately 25%, and at −10 dBm the peak efficiency of energy conversion model 771 is approximately 45%). In some cases, conversion efficiency can decrease for frequencies that are greater than the optimum input center frequency and can decrease for frequencies that are less than the optimum input center frequency.

In some aspects, the conversion efficiency of an energy harvesting device may be associated with one or more energy conversion characteristics (e.g., also referred to as energy harvesting characteristics). For example, one or more characteristics may be indicative of a relationship between the conversion efficiency of an energy harvesting device and input frequency. In one illustrative example, an energy harvesting device may have an approximately constant conversion efficiency over a narrowband operating bandwidth. In such examples, the energy harvesting device can receive RF energy from a multi-sine downlink wave with uniform power distribution. In another illustrative example, an energy harvesting device with a wideband operating bandwidth may have a conversion efficiency that is a non-linear function of input frequency over the wideband. A wideband bandwidth can be larger than a narrowband bandwidth. In such examples, the energy harvesting device may receive RF energy based on Gaussian and/or raised-cosine filters being used in combination with (e.g., on top of) the multi-sine downlink wave described above for narrowband operating bandwidths. In some aspects, a wideband bandwidth can be an operating bandwidth (e.g., message bandwidth) of a communication channel that is greater than a coherence bandwidth of the channel.

In some aspects, the energy conversion efficiency of an energy harvesting device may vary continuously with the input RF power. For example, the energy conversion efficiency may be zero for input powers less than the sensitivity threshold $$(P_{in}^{sen})$$

(e.g., based on the harvested power being equal to zero when the input RF power is below the sensitivity threshold, and conversion efficiency=harvested power/input RF power). In some examples, the energy conversion efficiency of an energy harvesting device may vary over different input frequencies (e.g., as described above with respect to FIG.

7B) and may additionally vary over different input RF powers. For example, in some cases the energy conversion efficiency of an energy harvesting device may be approximately linear with input RF power, for input RF power values between the sensitivity threshold $$(P_{in}^{sen})$$

and a first input RF power value greater than $$P_{in}^{sen}.$$

The energy conversion efficiency may increase linearly with the input RF power from and above $$P_{in}^{sen}.$$

At input RF powers beyond the linear conversion efficiency zone, the energy conversion efficiency of the energy harvesting device may increase and/or decrease non-linearly with further increases in input RF power. In some examples, the energy conversion efficiency may include one or more additional zones of linear increase (e.g., and/or linear decrease) with input RF power, in addition to an initial linear conversion efficiency zone beginning at the sensitivity threshold $$P_{in}^{sen}.$$

As previously noted, as 5G is expanding to more and more industrial verticals (e.g., besides eMBB, URLLC, and MTC), 5G and beyond can be expanded to support passive IoT devices. 3GPP has developed specifications to support MTC/NB-IoT and RedCap for MTC use cases. However, 5G cannot efficiently support the pervasive RFID-type of sensors (e.g., passive IoT devices) in many future use cases (e.g., asset management, logistics, warehousing, and manufacturing). In the future, 3GPP Release 18 and beyond (e.g., 6G) may be required to manage passive IoT devices. In one or more examples, a base station (e.g., gNB) may need to read and/or write information stored on passive IoT devices, provide energy to passive IoT devices, receive a reflected information-bearing signal from a passive IoT device, and/or read a reflected signal received from a passive IoT device to decode information transmitted by that passive IoT device.

Figure 8:
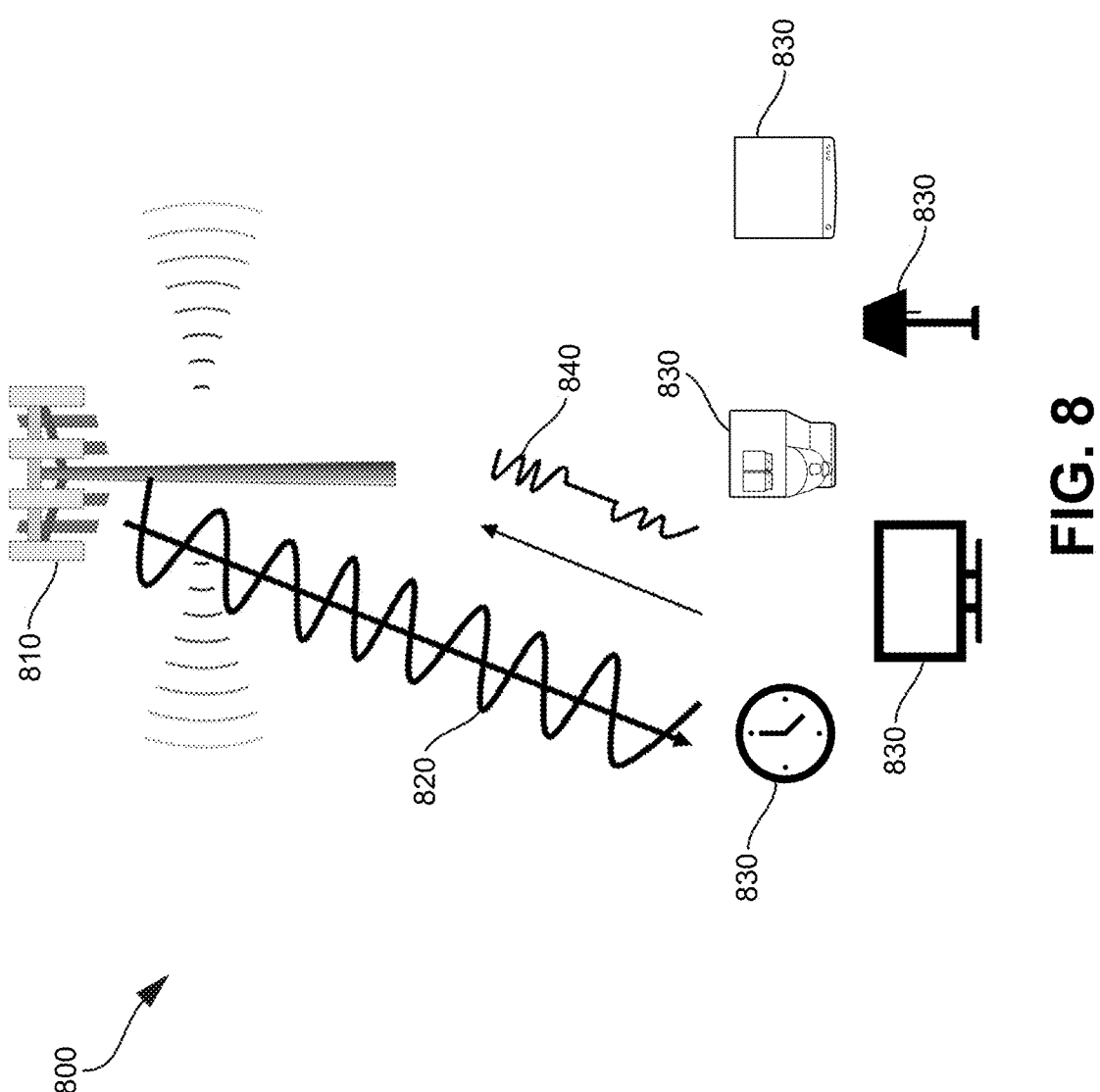
FIG. 8 is a diagram illustrating an example of a system including a plurality of passive-IoT devices, in accordance with some examples.

FIG. 8 shows an example of a base station (e.g., a network device, such as a gNB) providing energy to a plurality of passive IoT devices. In particular, FIG. 8 is a diagram illustrating an example of a system 800 including a plurality of passive-IoT devices 830. In FIG. 8, the system 800 is shown to include a reader 810 (e.g., in the form of a base station) transmitting a signal 820 (e.g., an energy signal and/or an information bearing signal) towards the passive IoT devices 830 (e.g., for power harvesting by the passive IoT devices). The IoT devices 830 in FIG. 8 are shown to be in various different forms including a clock, a video recorder, a vacuum, a lamp, and a power drill. After the passive IoT devices 830 receive the signal 820, the passive IoT devices each radiate a backscatter signal 840 in a direction back towards the reader 810.

RF power harvesting (PH) for passive IoT devices generally is non-linear with an input power needed for the PH circuitry of an IoT device (e.g., due to diodes within the PH circuitry). An input power larger than −20 dBm typically is needed (e.g., in some cases, an input power larger than −10 dBm may be needed) to "turn-on" the PH circuitry of an IoT device (e.g., to turn-on the voltage of the diodes within the PH circuitry). Power harvesting by passive IoT devices can be more efficient at lower frequencies, due to the diode junction capacitance and resistance of the PH circuitry (e.g., a frequency-selective conversion efficiency).

RFID devices, such as passive IoT devices in the form of RFID tags, can only support short-range communications, such as less than 10 meters, due to insufficient link budget issues. The power link for an RFID tag (e.g., the downlink, which is the reader to the RFID tag link) can be critical for powering the RFID tag. Typically, the PH circuitry of an RFID tag requires a high input power (e.g., larger than −13 dBm). An input power of −20 dBm or below cannot ensure satisfactory cost and conversion efficiency (e.g. below 1%) for an RFID tag.

Figure 9:
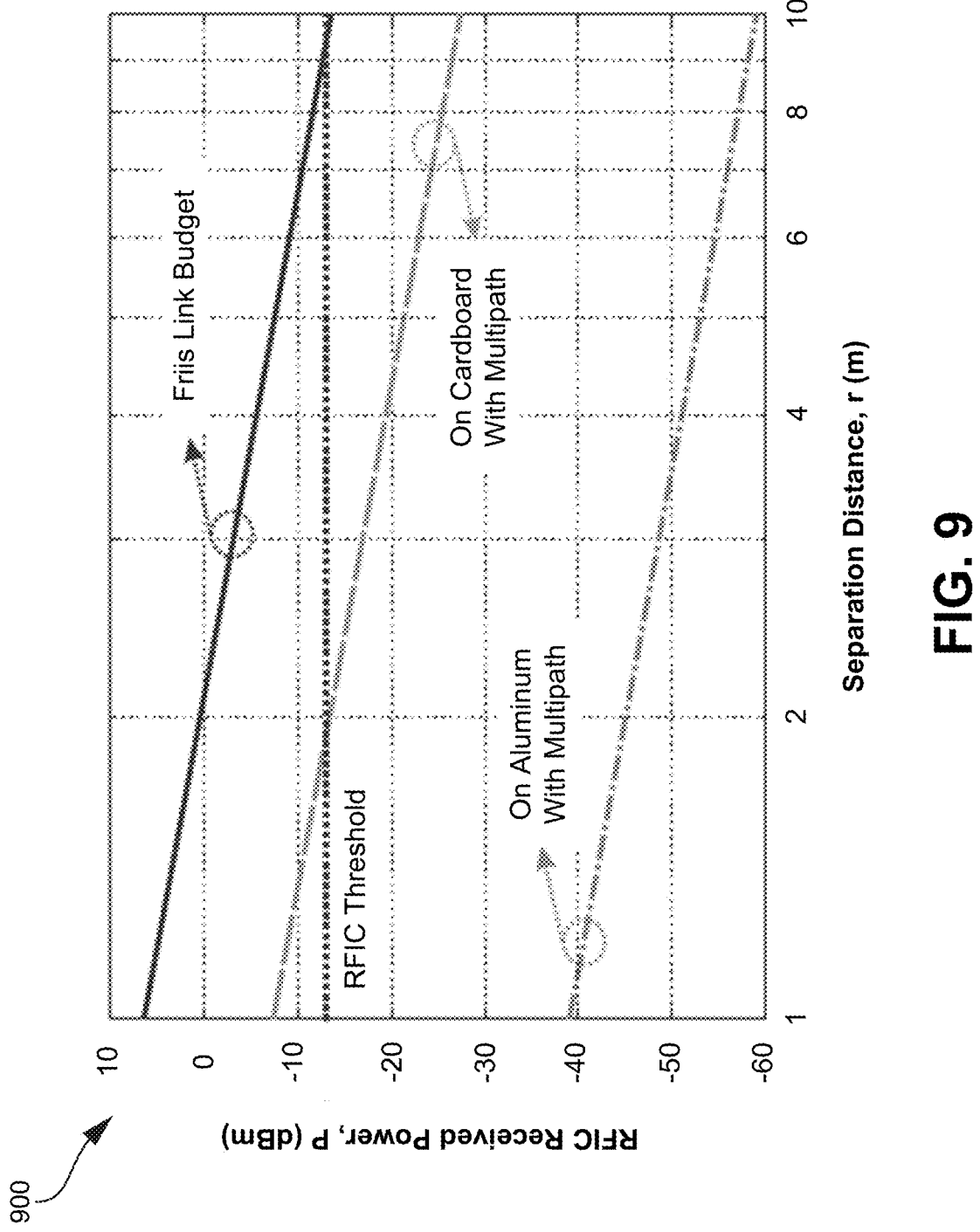
FIG. 9 is a graph showing an example of a received energy signals for power harvesting for passive-IoT devices, in accordance with some examples.

Reflections by multipath can cause fading in the energy signal and, as such, can degrade the range of the RFID tag. FIG. 9 shows different examples of energy signals with multipath degrading the range. In particular, FIG. 9 is a graph 900 showing examples of received energy signals for power harvesting for passive-IoT devices. In the graph 900 of FIG. 9, the x-axis represents the separation distance r in meters (e.g., distance between the reader and the RFID tag), and the y-axis represents the RFIC tag's received signal power P in dBm. On the graph 900, a constant RFIC power threshold of −13 dBm is shown. The graph 900 also shows how multipath can cause the signal strength of signals (e.g., of energy signals) to be degraded as compared to a Friis link budget generated signal.

Coverage of a wireless power transfer, such as a transfer of power from a reader to an RFID tag, can be improved by beamforming the signal (e.g., the power link) either in the space domain or in the frequency domain, where both methods require knowledge of the channel, such as channel state information (CSI). In the space domain, which beam to use for energy harvesting can be determined based on the CSI. In the frequency domain, which frequency to use for the energy harvesting can also be determined based on the CSI (e.g., the frequency with the highest channel gain can be chosen to be used for the energy harvesting). As such, the CSI is needed for both the space domain and the frequency domain.

In 5G NR, CSI can be obtained by either transmitting a CSI-RS and receiving feedback (e.g., a reflection signal) from a UE, or by using an SRS transmitted by a UE. However, for a semi-passive IoT tag (e.g., an RFID tag), it can be very energy intensive (and costly) to obtain (e.g., measure) the CSI by using a CSI-RS or an SRS. As such, an improved technique for estimating the CSI for an RFID tag(s) can be useful for energy harvesting for an RFID tag(s).

In one or more aspects, the systems and techniques can be used to provide shifted backscattering-based channel estimation for wireless power transfer of ambient-IoT devices, such as RFID tags. In one or more examples, the systems and techniques can provide a technique to estimate the CSI for an RFID tag(s) by using backscattering. In some examples, the systems and techniques can provide signaling required to multiplex RFID tags for the CSI estimation.

Figure 10:
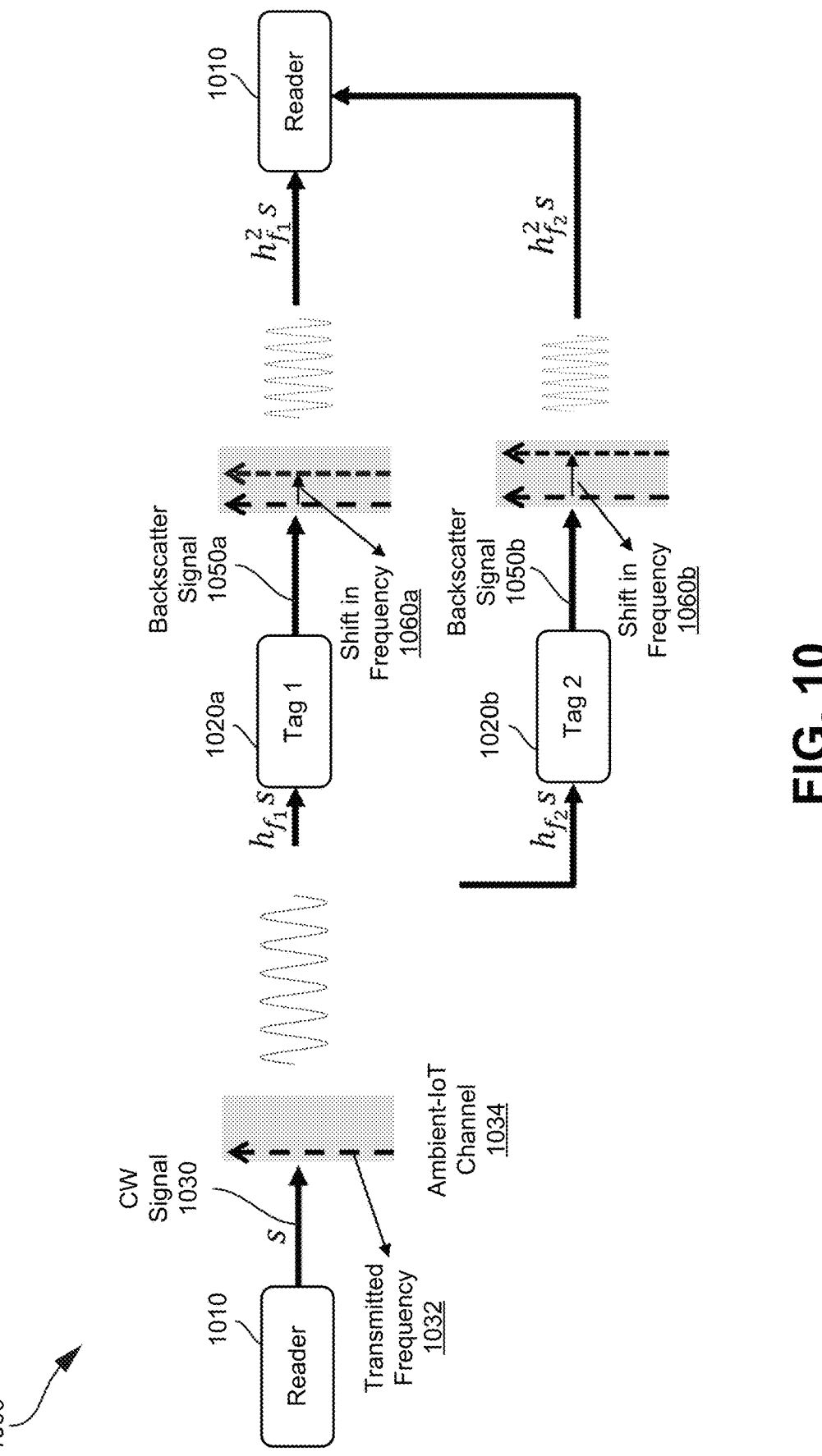
FIG. 10 is a diagram of an example of a system for shifted backscattering-based channel estimation for wireless power transfer of ambient-IoT devices, with transmission of a single ambient-IoT channel, in accordance with some examples.

FIG. 10 shows an example of a system for estimating CSI for RFID tags. In particular, FIG. 10 is a diagram of an example of a system 1000 for shifted backscattering-based channel estimation for wireless power transfer of ambient-IoT devices, with transmission of a single ambient-IoT channel 1034. In FIG. 10, the system 1000 is shown to include a reader 1010 (e.g., a network device, such a base station in the form of a gNB) and two tags 1020a, 1020b (e.g., each an ambient-IoT device, such as an RFID tag).

During operation for estimating CSI, the tags 1020a, 1020b can send (e.g., during a calibration process) tag information associated with each of the tags 1020a, 1020b. For example, tag 1 1020a can send tag information associated with itself, and tag 2 1020b can send tag information associated with itself. In one or more examples, the tag information can include a PPM requirement for the tag (e.g., which can be related to the stability of the local oscillator of the tag) and a frequency shift capability (e.g., a number of supported frequency shifts) for the tag.

After the reader 1010 receives the tag information from each of the tags 1020a, 1020b, based on the tag information from the tags 1020a, 1020b, the reader 1010 can determine a group of tags, from the tags 1020a, 1020b, (e.g., to be multiplexed) for estimating the CSI. For this example shown in FIG. 10, the reader 1010 can simply decide that both of the tags 1020a, 1020b are within the group of tags for estimating the CSI.

Based on the tag information from the tags 1020a, 1020b, the reader 1010 can determine (e.g., assign) a frequency shift for each of the tags within the group of tags. The reader 1010 can select the frequency shift of each tag 1020a, 1020b to be different from each other and such that the PPM requirements for the tags are satisfied. For example, the reader 1010 can assign a frequency shift of $f_1$ to tag 1 1020a, and a frequency shift of $f_2$ to tag 2 1020b. Assuming that the frequency gain in a bandwidth of a channel (e.g., an ambient IoT-channel 1034, which may have a 180 kilohertz frequency bandwidth) for a CW signal (e.g., CW signal s 1030) is almost constant, different tags 1020a, 1020b can shift the CW signal (e.g., CW signal s 1030) within a different frequency shift within the channel (e.g., within the 180 kilohertz channel).

After the reader 1010 has determined the group of tags (e.g., including tag 1 1020a and tag 2 1020b) and the different frequency shifts (e.g., $f_1$ and $f_2$) for each of the tags within the group of tags, the reader 1010 can send (e.g., transmit) a select signal to the group of tags 1020a, 1020b. The select signal can include select information. In one or more examples, the select information can include, but is not limited to, a group ID for the group of tags, the frequency shifts (e.g., $f_1$ and $f_2$) for each of the tags (e.g., which can include an associated tag ID for each of the frequency shifts), channel information and, optionally, a backscattering threshold value (e.g., a gain threshold value) for the backscattering by the tags. The channel information can include the number of channels (e.g., number of ambient-IoT channels, such as one ambient-IoT channel 1034) that are used for transmission and/or that the reader is measuring in time division multiplexing (TDM) for the CSI estimation (e.g., so that the tag frequency shifts the signal for the channels indicated by the channel information). Additionally or alternatively, the channel information can include the frequency 1032 (or frequencies) and time (or times) of transmission of the channel (or channels, such as when the reader is using TDM for transmission of the channels) that the reader will use to transmit a continuous wave (CW) signal for the CSI estimation.

Then, the reader 1010 can send (e.g., transmit) a CW signal s 1030 to the tags 1020a, 1020b in a channel (e.g., an ambient IoT-channel 1034, which may have a 180 kilohertz frequency bandwidth) as specified in the channel information. After the tags 1020a, 1020b receive the CW signal s 1030, the tags 1020a, 1020b can each radiate a backscatter signal 1050a, 1050b from the CW signal s 1030. The backscatter signal 1050a ($h_{f1}$s) radiated by tag 1020a has a shift in frequency 1060a of $f_1$, and the backscatter signal 1050b (has) radiated by tag 1020b has a shift in frequency 1060b of $f_2$.

In one or more examples, when a gain of the CW signal s 1030 received at a tag is greater than (or equal to) the gain threshold value, that tag may not radiate a backscatter signal from the CW signal s 1030. When a tag receives a gain greater than (or equal to) the gain threshold value, that tag is likely located near the reader 1010. Conversely, when a gain of the CW signal s 1030 received at a tag is less than the gain threshold value, that tag may backscatter the signal from the CW signal s 1030. When a tag receives a gain less than the gain threshold value, that tag is likely located far away from the reader 1010. Receiving a backscatter signals only from far away tags can help to increase the energy reception for far away tags, and can help to avoid the near-far effect at the reader 1010 when receiving backscattering signals from multiple tags at various different locations.

In some examples, based on previous feedback (e.g., gain values) received from the tags 1020a, 1020b, the reader 1010 itself may determine which tags of the group of tags should radiate backscatter signals. In one or more examples, the reader 1010 can include within the select signal an indication of which tags 1020a, 1020b within the group of tags should radiate a backscatter signal or should not radiate a backscatter signal.

The reader 1010 can then receive a sum signal of the radiated backscatter signals 1050a, 1050b (e.g., $h_{f1}$s and $h_{f2}$s) from the tags 1020a, 1020b. The reader 1010 can process the received backscatter signals 1050a, 1050b (e.g., $h_{f1}$s and $h_{f2}$s) from the tags 1020a, 1020b to determine (e.g., by using a homodyne receiver in the reader 1010) the responses from the tags 1020a, 1020b (e.g., $h_{f1}$ is the response of tag 1 1020a, and $h_2$ is the response of tag 2 1020b). From the responses from the backscatter signals 1050a, 1050b, the reader 1010 can then estimate the CSI for each of the tags 1020a, 1020b, assuming that the channel (e.g., ambient-IoT channel 1034) is constant and has channel reciprocity. Assuming channel reciprocity, the sum signal received by the reader 1010 will be proportional to the square of the frequency response over the channel. Based on the estimated CSI, the reader 1010 can then determine which tags 1020a, 1020b in the group of tags need to harvest energy.

Figure 11:
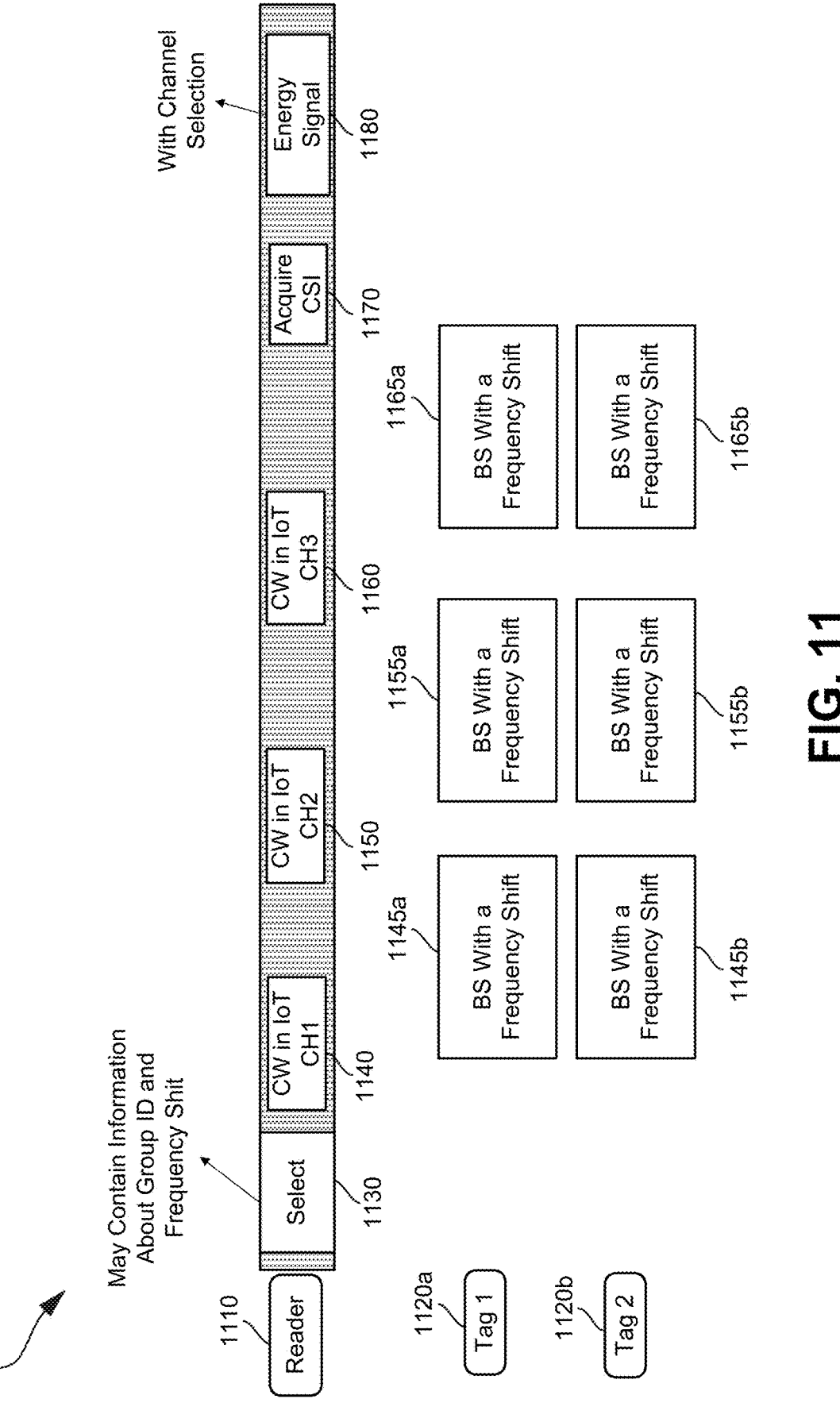
FIG. 11 is a diagram of an example of a system for shifted backscattering-based channel estimation for wireless power transfer of ambient-IoT devices, with transmission of multiple ambient-IoT channels, in accordance with some examples.

FIG. 11 shows an example of a system for estimating CSI for RFID tags using multiple channels. In particular, FIG. 11 is a diagram of an example of a system 1100 for shifted backscattering-based channel estimation for wireless power transfer of ambient-IoT devices, with transmission of multiple ambient-IoT channels, such as channel 1 (CH 1), channel 2 (CH 2), and channel 3 (CH 3). In FIG. 11, the system 1100 is shown to include a reader 1110 (e.g., a network device, such a base station in the form of a gNB) and two tags 1120a, 1120b (e.g., each an ambient-IoT device, such as an RFID tag).

During operation for estimating CSI, the tags 1120a, 1120b can send (e.g., during a calibration process) tag information associated with each of the tags 1120a, 1120b.

In one or more examples, tag 1 1120a can send tag information associated with itself, and tag 2 1120b can send tag information associated with itself. In some examples, the tag information can include a PPM requirement for the tag, which can be related to the stability of the local oscillator of the tag, and can include a frequency shift capability for the tag, such as a number of supported frequency shifts for the tag.

After the reader 1110 receives the tag information from each of the tags 1120a, 1120b, based on the tag information from the tags 1120a, 1120b, the reader 1110 can determine a group of tags, from the tags 1120a, 1120b, (e.g., to be multiplexed) for estimating the CSI. For this example in FIG. 11, the reader 1110 can decide that both of the tags 1120a, 1120b are within the group of tags for estimating the CSI.

Based on the tag information from the tags 1120a, 1120b, the reader 1110 can determine (e.g., assign) a frequency shift for each of the tags within the group of tags. The reader 1110 can choose the frequency shift of each tag 1120a, 1120b to be different, while ensuring that the PPM requirements for the tags 1120a, 1120b are satisfied.

After the reader 1110 has determined the group of tags (e.g., including tag 1 1120a and tag 2 1120b) and the different frequency shifts for each of the tags 1120a, 1120b within the group of tags, the reader 1110 can send (e.g., transmit) a select signal 1130 to the tags 1020a, 1020b in the group of tags. The select signal 1130 can include select information, which may include, but is not limited to, a group ID for the group of tags, the frequency shifts for each of the tags (e.g., which can include an associated tag ID for each of the frequency shifts), channel information and, optionally, a gain threshold value for backscattering by the tags. The channel information can include the number of channels (e.g., three, as is shown in the example of FIG. 11) used for transmission, and the frequencies and times of transmission of the channels (e.g., when using time division multiplexing for transmission of the channels) that the reader 1110 can use to transmit a CW signal (e.g., CW in IoT CH 1 1140, CW in IoT CH 2 1150, CW in IoT CH 3 1160) for the CSI estimation.

The reader 1110 can then send (e.g., transmit) a CW signal in IoT CH 1 1140 at a first time to the tags 1120a, 1120b, as specified in the channel information. After the tags 1120a, 1120b receive the CW signal in IoT CH 1 1140, the tags 1120a, 1120b can each radiate a backscatter signal 1145a, 1145b from the CW signal in IoT CH 1 1140.

Then, the reader 1110 can then send (e.g., transmit) a CW signal in IoT CH 2 1150 at a second time to the tags 1120a, 1120b, as specified in the channel information. After the tags 1120a, 1120b receive the CW signal in IoT CH 2 1150, the tags 1120a, 1120b can each radiate a backscatter signal 1155a, 1155b from the CW signal in IoT CH 2 1150.

The reader 1110 can then send (e.g., transmit) a CW signal in IoT CH 3 1160 at a third time to the tags 1120a, 1120b, as specified in the channel information. After the tags 1120a, 1120b receive the CW signal in IoT CH 3 1160, the tags 1120a, 1120b can each radiate a backscatter signal 1165a, 1165b from the CW signal in IoT CH 3 1160.

The reader 1110 can receive all of the radiated backscatter signals 1145a, 1145b, 1155a, 1155b, 1165a, 1165b from the tags 1120a, 1120b. The reader 1110 can process the received backscatter signals 1145a, 1145b, 1155a, 1155b, 1165a, 1165b from the tags 1120a, 1120b to determine the responses from the tags 1120a, 1120b. From the responses from the backscatter signals 1145a, 1145b, 1155a, 1155b, 1165a, 1165b, the reader 1110 can estimate the CSI 1170 for each of the tags 1120*a*, 1120*b*, assuming that each of the channels (e.g., CH 1, CH 2, and CH 3) is constant and has channel reciprocity. Based on the estimated CSI 1170, the reader 1110 can then determine which tags 1120*a*, 1120*b* in the group of tags need to harvest energy.

Based on the estimated CSI 1170, the reader 1110 can select a channel (e.g., CH 1, CH 2, or CH 3) for transmission of the energy signal(s) 1180 for the harvesting of energy. In one or more examples, the reader 1110 can transmit an adaptive multi-sine signal in the selected channel. With the adaptive mutlisine waveform, the reader 1110 can change the allocated power levels for the multiple sine frequencies, using the known channel gains. The reader 1110 can either allocate all of the power to a single sine wave with the frequency (e.g., channel) that has the largest channel gain (e.g., an adaptive single sine wave), or can allocate the power for multiple sine wave frequencies proportional to the channel gains of the channels (e.g., using a matched filter). When there are multiple tags that need to harvest energy, the reader 1110 can select the channel that can either optimize the average energy signal efficiency over all of the tags, or can select the channel that can optimize the tags with the lowest channel gains.

Figure 12:
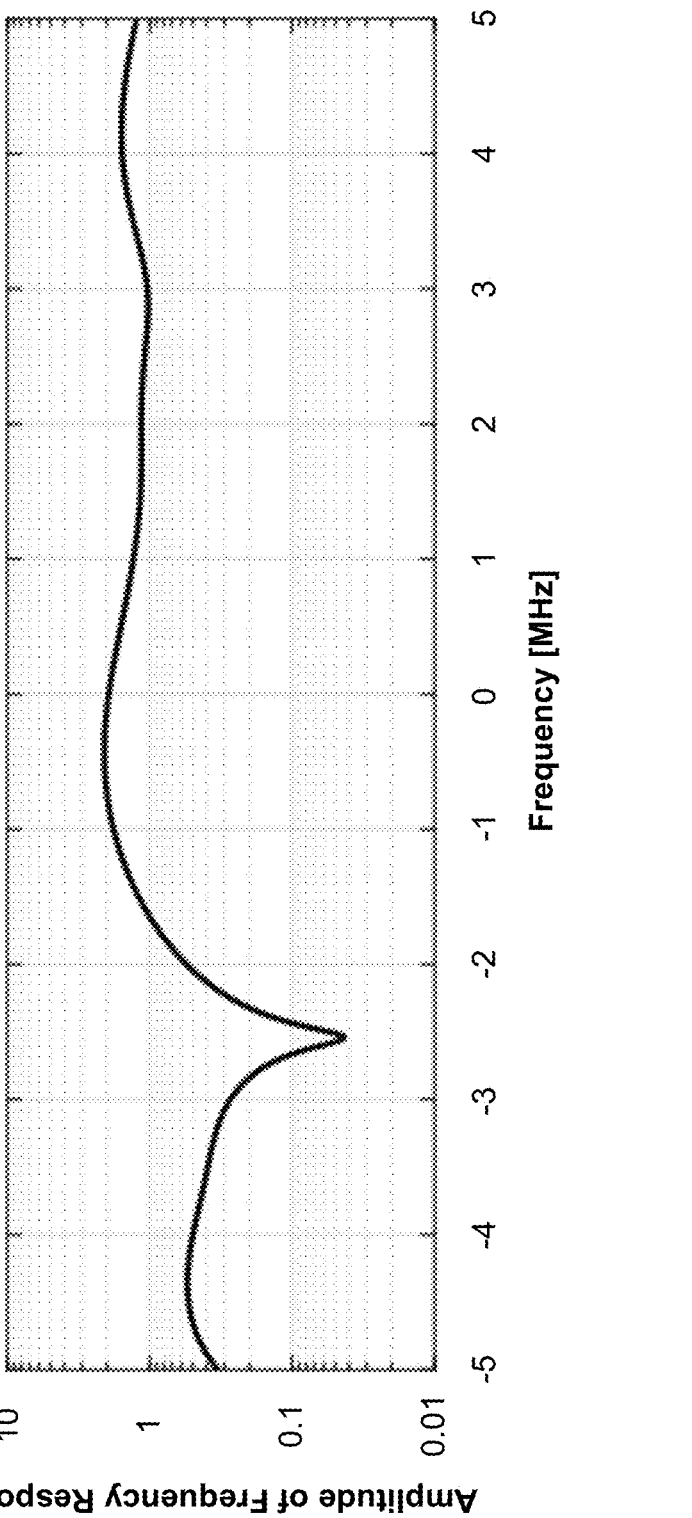
FIG. 12 is a graph of an example of a frequency response of a tag with shifted backscattering, in accordance with some examples.

As previously mentioned, assuming that the frequency gain in a bandwidth of a channel (e.g., a channel with a 180 kilohertz frequency bandwidth) for a CW signal (e.g., CW signal s 1030) is almost constant, different tags can shift the CW signal within a different frequency shift within the channel (e.g., within the 180 kilohertz channel). FIG. 12 shows an example of a frequency response for an indoor channel with a 100 nanosecond (ns) delay spread. In particular, FIG. 12 is a graph 1200 of an example of a frequency response of a tag with shifted backscattering. In the graph 1200, the x-axis represent the frequency in megahertz (MHz), and the y-axis represents the amplitude of the frequency response. As shown in the graph 1200, the channel gains are mostly constant within an 180 kilohertz bandwidth of the 10 MHz span of the graph 1200.

Figure 13A:
FIG. 13A is a flow diagram illustrating another example of a process for wireless communications performed at a network device, in accordance with some examples.
Figure 13A:
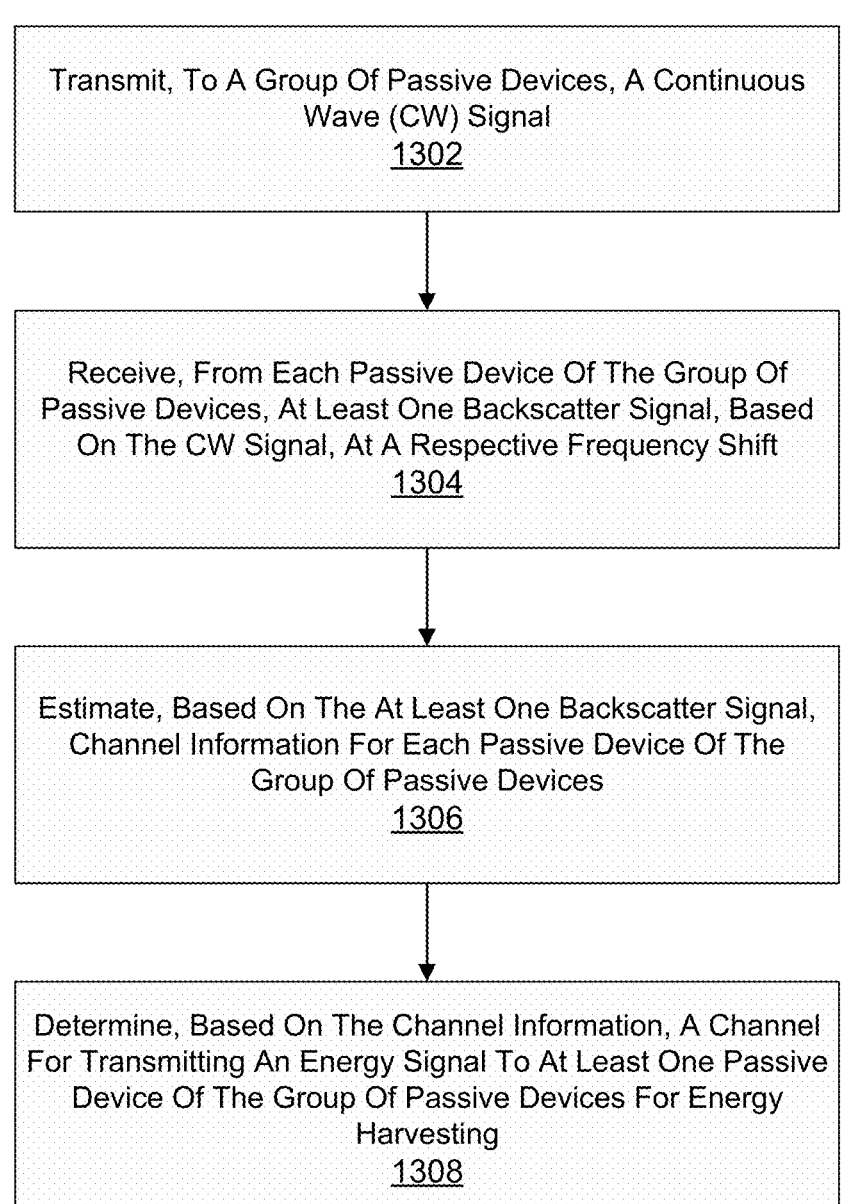

FIG. 13A is a flow chart illustrating an example of a process 1300 for providing shifted backscattering-based channel estimation for wireless power transfer of passive devices, such as ambient-IoT devices (e.g., RFID tags or other passive or ambient-IoT devices). The process 1300 can be performed by a network device (e.g., a reader, such as reader 1010 of FIG. 10, reader 1110 of FIG. 11, a base station, such as a gNB, or other network device) or by a component or system (e.g., a chipset) of the network device. The operations of the process 1300 may be implemented as software components that are executed and run on one or more processors (e.g., processor 1410 of FIG. 14 or other processor(s)). Further, the transmission and reception of signals by the network device in the process 1300 may be enabled, for example, by one or more antennas and/or one or more transceivers such as one or more wireless transceivers (e.g., one or more of the receivers, transmitters, and/or transceivers of FIG. 2, the communication interface 1440 of FIG. 14, and/or other antenna and/or transceiver).

At block 1302, the network device (or component thereof) can transmit (or output for transmission) a continuous wave (CW) signal to a group of passive devices. Referring to FIG. 10 as an illustrative example, the reader 1010 can transmit a CW signal s 1030 to the tags 1020*a*, 1020*b* in a channel (e.g., an ambient IoT-channel 1034, which may have a 180 kilohertz frequency bandwidth). In some cases, the channel can be specified in channel information provided to the group of passive devices. In some examples, each passive device of the group of passive devices is an ambient-IoT device, such as a radio frequency identification (RFID) tag. In some cases, one or more of the passive devices of the group of passive devices can be a semi-passive device. In some aspects, the network device (or component thereof) can transmit (or output for transmission) the CW signal in one or more channels at one or more times (e.g., in a TDM-based manner).

In some aspects, the network device (or component thereof) can determine the group of passive devices. For instance, referring to FIG. 10 as an illustrative example, the tags 1020*a*, 1020*b* can send (e.g., during a calibration process) tag information associated with each of the tags 1020*a*, 1020*b* to the reader 1010 (which can operate as the network device). In some cases, the tag information can include a PPM requirement for the tag (e.g., which can be related to the stability of the local oscillator of the tag) and a frequency shift capability (e.g., a number of supported frequency shifts) for the tag. Based on the tag information from the tags 1020*a*, 1020*b*, the reader 1010 can determine a group of tags from the tags 1020*a*, 1020*b* (e.g., to be multiplexed) for estimating the CSI. In some cases, based on the tag information from the tags 1020*a*, 1020*b*, the reader 1010 can determine (e.g., assign) a frequency shift for each of the tags within the group of tags. The reader 1010 can select the frequency shift of each tag 1020*a*, 1020*b* to be different from each other and, in some cases, such that the PPM requirements for the tags are satisfied.

At block 1304, the network device (or component thereof) can receive, from each passive device of the group of passive devices, at least one backscatter signal (which is based on the CW signal) at a respective frequency shift. In some aspects, the network device (or component thereof) can determine the respective frequency shift for each passive device of the group of passive devices based on a parts per million (PPM) requirement for each passive device. In some cases, the network device (or component thereof) can determine the respective frequency shift for each passive device of the group of passive devices based on a frequency shift capability for each passive device. In some aspects, the network device (or component thereof) can transmit (or output for transmission), to each passive device in the group of passive devices, a signal including the respective frequency shift for each passive device of the group of passive devices.

At block 1306, the network device (or component thereof) can estimate, based on the at least one backscatter signal, channel information for each passive device of the group of passive devices. In some cases, the channel information includes channel state information (CSI).

At block 1308, the network device (or component thereof) can determine, based on the channel information, a channel for transmitting an energy signal to at least one passive device of the group of passive devices for energy harvesting. In some aspects, the network device (or component thereof) can determine that the at least one passive device of the group of passive devices needs energy harvesting based on the channel information. In some cases, the network device (or component thereof) can then transmit (or output for transmission) the energy signal on the channel to the at least one passive device of the group of passive devices.

In some aspects, the network device (or component thereof) can transmit (or output for transmission) a backscattering threshold value to at least one passive device of the group of passive devices. As described herein, the backscattering threshold value can indicate a maximum level for transmitting a backscatter signal. In one illustrative example, the maximum level for transmitting the backscatter signal is a maximum gain value of the CW signal received by the at least one passive device. In some cases, the network device (or component thereof) can transmit (or output for transmission), to at least one passive device of the group of passive devices, an indication of a number of channels for which the channel information is estimated.

In some cases, the backscattering threshold value and the indication of the number of channels is transmitted as part of a select signal, as described herein. For instance, referring again to FIG. 10 as an illustrative example, once the reader 1010 determines the group of tags (e.g., including tag 1 1020*a* and tag 2 1020*b*) and the different frequency shifts (e.g., $f_1$ and $f_2$) for each of the tags within the group of tags, the reader 1010 can transmit a select signal to the group of tags 1020*a*, 1020*b*. The select signal can include select information, which can include a group ID for the group of tags, the frequency shifts (e.g., $f_1$ and $f_2$) for each of the tags (e.g., which can include an associated tag ID for each of the frequency shifts), channel information, a backscattering threshold value (e.g., a gain threshold value) for the backscattering by the tags, any combination thereof, and/or other information. The channel information can include the number of channels (e.g., number of ambient-IoT channels, such as one ambient-IoT channel 1034) that are used for transmission and/or that the reader is measuring in TDM for the CSI estimation (e.g., so that the tag frequency shifts the signal for the channels indicated by the channel information). Additionally or alternatively, the channel information can include the frequency 1032 (or frequencies) and time (or times) of transmission of the channel (or channels, such as when the reader is using TDM for transmission of the channels) that the reader will use to transmit a continuous wave (CW) signal for the CSI estimation.

Figure 13B:
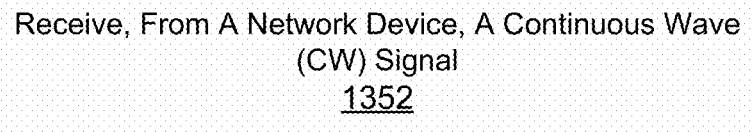
FIG. 13B is a flow diagram illustrating another example of a process for wireless communications performed at a passive device, in accordance with some examples.

FIG. 13B is a flow chart illustrating an example of a process 1350 for performing wireless communications (e.g., transmitting backscattering signals) based on shifted backscattering-based channel estimation for wireless power transfer of passive devices, such as ambient-IoT devices. The process 1350 can be performed by a passive device (e.g., an ambient-IoT device, such as an RFID tag) or by a component or system (e.g., a chipset) of the passive device. In some cases, the passive device can be a semi-passive device. The operations of the process 1350 may be implemented as software components that are executed and run on one or more processors (e.g., the processor 1410 of FIG. 14 or other processor(s)) or other computing components (e.g., one or more of the components of the RF energy harvesting device 500 of FIG. 5). Further, the transmission and reception of signals by the network device in the process 1350 may be enabled, for example, by one or more antennas, one or more transceivers such as one or more wireless transceivers, and/or other communications components (e.g., one or more of the receivers, transmitters, and/or transceivers of FIG. 2, the antenna 590 of FIG. 5, the modulator 560 of FIG. 5, and/or other component of the RF energy harvesting device 500 of FIG. 5, the communication interface 1440 of FIG. 14, and/or other antenna, transceiver, and/or other communications components).

At block 1352, the passive device (or component thereof) can receive a continuous wave (CW) signal from a network device (e.g., a reader, a base station, or other network device).

At block 1354, the passive device (or component thereof) can transmit (or output for transmission), to the network device based on the CW signal, a backscatter signal at a frequency shift for estimating channel information (e.g., CSI) for the passive device. In some aspects, the passive device (or component thereof) can receive, from the network device, a signal comprising the frequency shift for the passive device. The passive device (or component thereof) can receive an energy harvesting signal from the network device based on the estimated channel information (e.g., as described above with respect to FIG. 10, FIG. 11, and/or FIG. 13A).

In some aspects, the passive device (or component thereof) can transmit (or output for transmission), to the network device, a parts per million (PPM) requirement for the passive device. In some cases, the passive device (or component thereof) can transmit (or output for transmission), to the network device, a number of frequency shifts supported by the passive device. In some examples, the PPM requirement for the passive device, the number of frequency shifts supported by the passive device can be included in tag information transmitted by the passive device to the network device. In some cases, as described herein, based on the tag information from the passive device and one or more other passive devices, the network device can determine a group of tags including the passive device for estimating the CSI.

In some aspects, the passive device (or component thereof) can receive a backscattering threshold value. As described herein, the backscattering threshold value can indicate a maximum level (e.g., a maximum gain value of the received CW signal) for transmitting a backscatter signal. The passive device (or component thereof) can determine to transmit the backscatter signal to the network device based on the backscattering threshold value. In some cases, the passive device (or component thereof) can receive, from the network device, an indication of a number of channels for which the channel information is estimated. In some aspects, the backscattering threshold value and the indication of the number of channels is transmitted as part of a select signal, as described herein.

In some examples, the processes described herein (e.g., process 1300, process 1350, and/or other process described herein) may be performed by a computing device or apparatus (e.g., a network node such as a UE, base station, a portion of a base station, etc.). For example, as noted above, one or more of the processes described herein (e.g., the process 1300, the process 1350, and/or other process described herein) may be performed by a UE and/or an energy harvesting device (e.g., an EH-capable device). In some examples, one or more of the processes described herein (e.g., the process 1300 and/or other process described herein) may be performed by an EH-capable device with an architecture that is the same as or similar to the EH-capable device architecture shown in FIG. 5.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1300 and the process 1350 is illustrated as a logical flow diagram, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1300, the process 1350, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
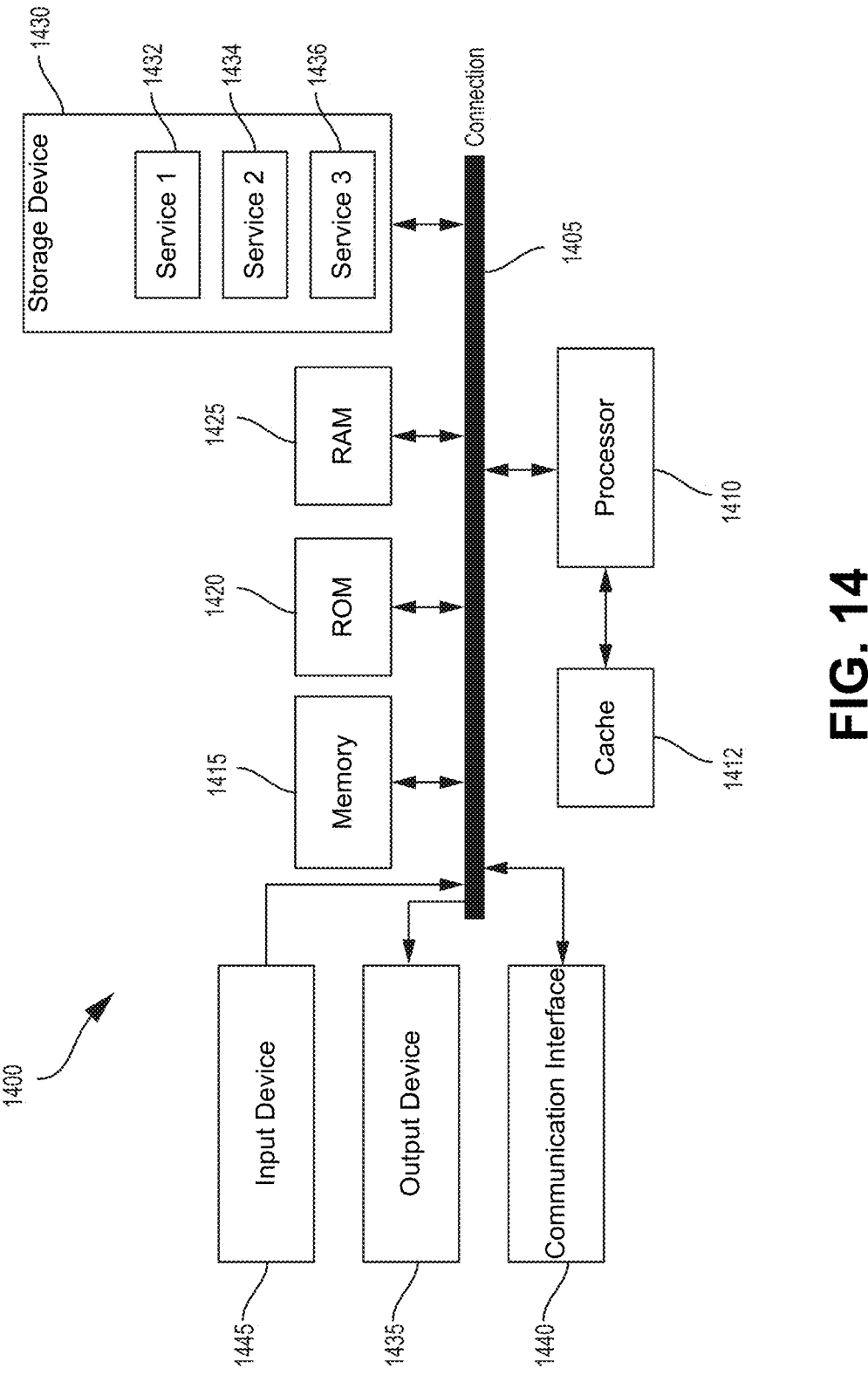
FIG. 14 is a block diagram illustrating an example of a computing system, in accordance with some examples.

FIG. 14 is a diagram illustrating an example of a system for implementing certain aspects of the present technology. In particular, FIG. 14 illustrates an example of computing system 1400, which may be for example any computing device making up internal computing system, a remote computing system, a camera, or any component thereof in which the components of the system are in communication with each other using connection 1405. Connection 1405 may be a physical connection using a bus, or a direct connection into processor 1410, such as in a chipset architecture. Connection 1405 may also be a virtual connection, networked connection, or logical connection.

In some aspects, computing system 1400 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1400 includes at least one processing unit (CPU or processor) 1410 and connection 1405 that communicatively couples various system components including system memory 1415, such as read-only memory (ROM) 1420 and random access memory (RAM) 1425 to processor 1410. Computing system 1400 may include a cache 1415 of high-speed memory connected directly with, in close proximity to, or integrated as part of processor 1410.

Processor 1410 may include any general-purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which may represent any number of input mechanisms, such as a microphone for speech, a touch-sensitive screen for gesture or graphical input, keyboard, mouse, motion input, speech, etc. Computing system 1400 may also include output device 1435, which may be one or more of a number of output mechanisms. In some instances, multimodal systems may enable a user to provide multiple types of input/output to communicate with computing system 1400.

Computing system 1400 may include communications interface 1440, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1430 may include software services, servers, services, etc., that when the code that defines such software is executed by the processor 1410, it causes the system to perform a function. In some aspects, a hardware service that performs a particular function may include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly.

Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. A network device for wireless communication, the network device comprising: at least one memory; and at least one processor coupled to the at least one memory and configured to: output, for transmission to a group of passive devices, a continuous wave (CW) signal; receive, from each passive device of the group of passive devices, at least one backscatter signal, based on the CW signal, at a respective frequency shift; estimate, based on the at least one backscatter signal, channel information for each passive device of the group of passive devices; and determine, based on the channel information, a channel for transmitting an energy signal to at least one passive device of the group of passive devices for energy harvesting.

Aspect 2. The network device of Aspect 1, wherein the network device is a base station.

Aspect 3. The network device of any one of Aspects 1 or 2, wherein each passive device of the group of passive devices is a radio frequency identification (RFID) tag.

Aspect 4. The network device of any one of Aspects 1 to 3, wherein the at least one processor is configured to output the CW signal for transmission in one or more channels at one or more times.

Aspect 5. The network device of any one of Aspects 1 to 4, wherein the at least one processor is configured to determine the respective frequency shift for each passive device of the group of passive devices based on a parts per million (PPM) requirement for each passive device.

Aspect 6. The network device of any one of Aspects 1 to 5, wherein the at least one processor is configured to determine the respective frequency shift for each passive device of the group of passive devices based on a frequency shift capability for each passive device.

Aspect 7. The network device of any one of Aspects 1 to 6, wherein the at least one processor is configured to output, for transmission to each passive device in the group of passive devices, a signal comprising the respective frequency shift for each passive device of the group of passive devices.

Aspect 8. The network device of any one of Aspects 1 to 7, wherein the at least one processor is configured to output the energy signal on the channel for transmission to the at least one passive device of the group of passive devices.

Aspect 9. The network device of any one of Aspects 1 to 8, wherein the at least one processor is configured to determine that the at least one passive device of the group of passive devices needs energy harvesting based on the channel information.

Aspect 10. The network device of any one of Aspects 1 to 9, wherein the channel information comprises channel state information (CSI).

Aspect 11. The network device of any one of Aspects 1 to 10, wherein the at least one processor is configured to output a backscattering threshold value for transmission to at least one passive device of the group of passive devices, the backscattering threshold value indicating a maximum level for transmitting a backscatter signal.

Aspect 12. The network device of Aspect 11, wherein the maximum level for transmitting the backscatter signal is a maximum gain value of the CW signal received by the at least one passive device.

Aspect 13. The network device of any one of Aspects 1 to 12, wherein the at least one processor is configured to output, for transmission to at least one passive device of the group of passive devices, an indication of a number of channels for which the channel information is estimated.

Aspect 14. A passive device for wireless communication, the passive device comprising: at least one memory; and at least one processor coupled to the at least one memory and configured to: receive, from a network device, a continuous wave (CW) signal; and output, for transmission to the network device based on the CW signal, a backscatter signal at a frequency shift for estimating channel information for the passive device.

Aspect 15. The passive device of Aspect 14, wherein the at least one processor is configured to receive, from the network device, an energy harvesting signal based on the estimated channel information.

Aspect 16. The passive device of any one of Aspects 14 or 15, wherein the passive device is a radio frequency identification (RFID) tag.

Aspect 17. The passive device of any one of Aspects 14 to 16, wherein the network device is a base station.

Aspect 18. The passive device of any one of Aspects 14 to 17, wherein the at least one processor is configured to output, for transmission to the network device, a parts per million (PPM) requirement for the passive device.

Aspect 19. The passive device of any one of Aspects 14 to 18, wherein the at least one processor is configured to output, for transmission to the network device, a number of frequency shifts supported by the passive device.

Aspect 20. The passive device of any one of Aspects 14 to 19, wherein the at least one processor is configured to receive, from the network device, a signal comprising the frequency shift for the passive device.

Aspect 21. The passive device of any one of Aspects 14 to 20, wherein the channel information comprises channel state information (CSI).

Aspect 22. The passive device of any one of Aspects 14 to 21, wherein the at least one processor is configured to: receive, from the network device, a backscattering threshold value, the backscattering threshold value indicating a maximum level for transmitting a backscatter signal; and determine, based on the backscattering threshold value, to transmit the backscatter signal to the network device.

Aspect 23. The passive device of Aspect 22, wherein the maximum level for transmitting the backscatter signal is a maximum gain value of the received CW signal.

Aspect 24. The passive device of any one of Aspects 14 to 23, wherein the at least one processor is configured to: receive, from the network device, an indication of a number of channels for which the channel information is estimated.

Aspect 25. A method of wireless communication performed by a network device, comprising: transmitting, by the network device to a group of passive devices, a continuous wave (CW) signal; receiving, by the network device from each passive device of the group of passive devices, at least one backscatter signal, based on the CW signal, at a respective frequency shift; estimating, by the network device based on the at least one backscatter signal, channel information for each passive device of the group of passive devices; and determining, by the network device based on the channel information, a channel for transmitting an energy signal to at least one passive device of the group of passive devices for energy harvesting.

Aspect 26. The method of Aspect 25, wherein the network device is a base station.

Aspect 27. The method of any one of Aspects 25 or 26, wherein each passive device of the group of passive devices is a radio frequency identification (RFID) tag.

Aspect 28. The method of any one of Aspects 25 to 27, further comprising transmitting the CW signal in one or more channels at one or more times.

Aspect 29. The method of any one of Aspects 25 to 28, further comprising determining, by the network device, the respective frequency shift for each passive device of the group of passive devices based on a parts per million (PPM) requirement for each passive device.

Aspect 30. The method of any one of Aspects 25 to 29, further comprising determining, by the network device, the respective frequency shift for each passive device of the group of passive devices based on a frequency shift capability for each passive device.

Aspect 31. The method of any one of Aspects 25 to 30, further comprising transmitting, by the network device to each passive device in the group of passive devices, a signal comprising the respective frequency shift for each passive device of the group of passive devices.

Aspect 32. The method of any one of Aspects 25 to 31, further comprising transmitting, by the network device, the energy signal on the channel to the at least one passive device of the group of passive devices.

Aspect 33. The method of any one of Aspects 25 to 32, further comprising determining, by the network device, that the at least one passive device of the group of passive devices needs energy harvesting based on the channel information.

Aspect 34. The method of any one of Aspects 25 to 33, wherein the channel information comprises channel state information (CSI).

Aspect 35. The method of any one of Aspects 25 to 34, further comprising transmitting a backscattering threshold value to at least one passive device of the group of passive devices, the backscattering threshold value indicating a maximum level for transmitting a backscatter signal.

Aspect 36. The method of Aspect 35, wherein the maximum level for transmitting the backscatter signal is a maximum gain value of the CW signal received by the at least one passive device.

Aspect 37. The method of any one of Aspects 25 to 36, further comprising transmitting, to at least one passive device of the group of passive devices, an indication of a number of channels for which the channel information is estimated.

Aspect 38. A method of wireless communication performed by a passive device, comprising: receiving, by the passive device from a network device, a continuous wave (CW) signal; and transmitting, by the passive device to the network device based on the CW signal, a backscatter signal at a frequency shift for estimating channel information for the passive device.

Aspect 39. The method of Aspect 38, further comprising receiving, by the passive device from the network device, an energy harvesting signal based on the estimated channel information.

Aspect 40. The method of any one of Aspects 38 or 39, wherein the passive device is a radio frequency identification (RFID) tag.

Aspect 41. The method of any one of Aspects 38 to 40, wherein the network device is a base station.

Aspect 42. The method of any one of Aspects 38 to 41, further comprising transmitting, by the passive device to the network device, a parts per million (PPM) requirement for the passive device.

Aspect 43. The method of any one of Aspects 38 to 42, further comprising transmitting, by the passive device to the network device, a number of frequency shifts supported by the passive device.

Aspect 44. The method of any one of Aspects 38 to 43, further comprising receiving, by the passive device from the network device, a signal comprising the frequency shift for the passive device.

Aspect 45. The method of any one of Aspects 38 to 44, wherein the channel information comprises channel state information (CSI).

Aspect 46. The method of any one of Aspects 38 to 45, further comprising: receiving, from the network device, a backscattering threshold value, the backscattering threshold value indicating a maximum level for transmitting a backscatter signal; and determining, based on the backscattering threshold value, to transmit the backscatter signal to the network device.

Aspect 47. The method of Aspect 46, wherein the maximum level for transmitting the backscatter signal is a maximum gain value of the received CW signal.

Aspect 48. The method of any one of Aspects 38 to 47, further comprising: receiving, from the network device, an indication of a number of channels for which the channel information is estimated.

Aspect 49. A non-transitory computer-readable storage medium comprising instructions stored thereon which, when executed by at least one processor, causes the at least one processor to perform operations according to any one of Aspects 25 to 37.

Aspect 50. An apparatus for wireless communication, comprising one or more means for performing operations according to any one of Aspects 25 to 37.

Aspect 51. A non-transitory computer-readable storage medium comprising instructions stored thereon which, when executed by at least one processor, causes the at least one processor to perform operations according to any one of Aspects 38 to 48.

Aspect 52. An apparatus for wireless communication, comprising one or more means for performing operations according to any one of Aspects 38 to 48.

Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A network device for wireless communication, the network device comprising:
    at least one memory; and
    at least one processor coupled to the at least one memory and configured to:
        output, for transmission to a group of passive devices, a continuous wave (CW) signal;
        receive, from each passive device of the group of passive devices, at least one backscatter signal, based on the CW signal, at a respective frequency shift;
        estimate, based on the at least one backscatter signal, channel information for each passive device of the group of passive devices; and determine, based on the channel information, a frequency of a channel for transmitting an energy signal to at least one passive device of the group of passive devices for energy harvesting.

2. The network device of claim 1, wherein the network device is a base station.

3. The network device of claim 1, wherein each passive device of the group of passive devices is a radio frequency identification (RFID) tag.

4. The network device of claim 1, wherein the at least one processor is configured to output the CW signal for transmission in one or more channels at one or more times.

5. The network device of claim 1, wherein the at least one processor is configured to determine the respective frequency shift for each passive device of the group of passive devices based on a parts per million (PPM) requirement for each passive device.

6. The network device of claim 1, wherein the at least one processor is configured to determine the respective frequency shift for each passive device of the group of passive devices based on a frequency shift capability for each passive device.

7. The network device of claim 1, wherein the at least one processor is configured to output, for transmission to each passive device in the group of passive devices, a signal comprising the respective frequency shift for each passive device of the group of passive devices.

8. The network device of claim 1, wherein the at least one processor is configured to output the energy signal on the channel for transmission to the at least one passive device of the group of passive devices.

9. The network device of claim 1, wherein the at least one processor is configured to determine that the at least one passive device of the group of passive devices needs energy harvesting based on the channel information.

10. The network device of claim 1, wherein the respective frequency shift is caused by each passive device.

11. The network device of claim 1, wherein the at least one processor is configured to output a backscattering threshold value for transmission to at least one passive device of the group of passive devices, the backscattering threshold value indicating a maximum level for transmitting a backscatter signal.

12. The network device of claim 11, wherein the maximum level for transmitting the backscatter signal is a maximum gain value of the CW signal received by the at least one passive device.

13. The network device of claim 1, wherein the at least one processor is configured to output, for transmission to at least one passive device of the group of passive devices, an indication of a number of channels for which the channel information is estimated.

14. A passive device for wireless communication, the passive device comprising:

at least one memory; and at least one processor coupled to the at least one memory and configured to:

receive, from a network device, a continuous wave (CW) signal;

output, for transmission to the network device based on the CW signal, a backscatter signal at a frequency shift for estimating channel information for the passive device; and receive, from the network device via a channel based on a channel frequency determined based on the estimated channel information, an energy harvesting signal based on the estimated channel information.

15. The passive device of claim 14, wherein to output the backscatter signal at a frequency shift, the at least one processor is configured to adjust the backscatter signal.

16. The passive device of claim 14, wherein the passive device is a radio frequency identification (RFID) tag.

17. The passive device of claim 14, wherein the network device is a base station.

18. The passive device of claim 14, wherein the at least one processor is configured to output, for transmission to the network device, a parts per million (PPM) requirement for the passive device.

19. The passive device of claim 14, wherein the at least one processor is configured to output, for transmission to the network device, a number of frequency shifts supported by the passive device.

20. The passive device of claim 14, wherein the at least one processor is configured to receive, from the network device, a signal comprising the frequency shift for the passive device.

21. The passive device of claim 14, wherein the channel information comprises channel state information (CSI).

22. The passive device of claim 14, wherein the at least one processor is configured to:

receive, from the network device, a backscattering threshold value, the backscattering threshold value indicating a maximum level for transmitting a backscatter signal; and determine, based on the backscattering threshold value, to transmit the backscatter signal to the network device.

23. The passive device of claim 22, wherein the maximum level for transmitting the backscatter signal is a maximum gain value of the received CW signal.

24. The passive device of claim 14, wherein the at least one processor is configured to:

receive, from the network device, an indication of a number of channels for which the channel information is estimated.

25. A method of wireless communication performed by a network device, comprising:

transmitting, by the network device to a group of passive devices, a continuous wave (CW) signal;

receiving, by the network device from each passive device of the group of passive devices, at least one backscatter signal, based on the CW signal, at a respective frequency shift;

estimating, by the network device based on the at least one backscatter signal, channel information for each passive device of the group of passive devices; and determining, by the network device based on the channel information, a frequency of a channel for transmitting an energy signal to at least one passive device of the group of passive devices for energy harvesting.

26. The method of claim 25, further comprising determining, by the network device, the respective frequency shift for each passive device of the group of passive devices based on a parts per million (PPM) requirement for each passive device.

27. The method of claim 25, further comprising determining, by the network device, the respective frequency shift for each passive device of the group of passive devices based on a frequency shift capability for each passive device.

28. The method of claim 25, further comprising transmitting a backscattering threshold value to at least one passive device of the group of passive devices, the backscattering threshold value indicating a maximum level for transmitting a backscatter signal.

29. The method of claim 25, further comprising transmitting, to at least one passive device of the group of passive devices, an indication of a number of channels for which the channel information is estimated.

30. A method of wireless communication performed by a passive device, comprising:

receiving, by the passive device from a network device, a continuous wave (CW) signal;

transmitting, by the passive device to the network device based on the CW signal, a backscatter signal at a frequency shift for estimating channel information for the passive device; and receiving, from the network device via a channel based on a channel frequency determined based on the estimated channel information, an energy harvesting signal based on the estimated channel information.

\*　\*　\*　\*　\*